US011866046B2

(12) United States Patent
Weiser

(10) Patent No.: US 11,866,046 B2
(45) Date of Patent: Jan. 9, 2024

(54) SMART TRAFFIC CONTROL DEVICES AND BEACONS, METHODS OF THEIR OPERATION, AND USE BY VEHICLES OF INFORMATION PROVIDED BY THE DEVICES AND BEACONS

(71) Applicant: Anatoly S. Weiser, San Diego, CA (US)

(72) Inventor: Anatoly S. Weiser, San Diego, CA (US)

( * ) Notice: Subject to any disclaimer, the term of this patent is extended or adjusted under 35 U.S.C. 154(b) by 638 days.

(21) Appl. No.: 17/061,576

(22) Filed: Oct. 1, 2020

(65) Prior Publication Data

US 2021/0016777 A1 Jan. 21, 2021

Related U.S. Application Data

(63) Continuation-in-part of application No. 17/039,885, filed on Sep. 30, 2020, now Pat. No. 11,685,376, which is a continuation of application No. 16/112,743, filed on Aug. 26, 2018, now Pat. No. 10,836,393.

(60) Provisional application No. 62/596,891, filed on Dec. 10, 2017.

(51) Int. Cl.
| | |
|---|---|
| *B60W 30/18* | (2012.01) |
| *G08G 1/096* | (2006.01) |
| *G08G 1/097* | (2006.01) |
| *G08B 5/00* | (2006.01) |
| *G09F 9/00* | (2006.01) |

(52) U.S. Cl.
CPC ......... *B60W 30/18154* (2013.01); *G08B 5/00* (2013.01); *G08G 1/096* (2013.01); *G08G 1/097* (2013.01); *G09F 9/00* (2013.01); *B60W 2555/60* (2020.02); *B60W 2556/45* (2020.02)

(58) Field of Classification Search
CPC ....... B60W 30/18154; B60W 2556/45; B60W 2556/60; G08B 5/00; G08G 1/096; G08G 1/097; G09F 9/00
USPC .......................................................... 701/2
See application file for complete search history.

(56) References Cited

U.S. PATENT DOCUMENTS

| | | | |
|---|---|---|---|
| 10,699,142 B2* | 6/2020 | Wisniowski | ......... G06V 10/764 |
| 10,836,393 B2* | 11/2020 | Weiser | ................... G08G 1/097 |
| 2020/0012870 A1* | 1/2020 | Caron | ....................... G06T 7/73 |

(Continued)

*Primary Examiner* — Joshua E Rodden
(74) *Attorney, Agent, or Firm* — Anatoly S. Weiser, Esq.; IPLCounsel.com

(57) ABSTRACT

Traffic control systems implement methods for detecting various malfunctions including faulty sensors and sensor connections that may result in false green requests, undetected green requests, and faults with the visual displays of a traffic control device (TCD). The sensors may include inductive loops and pedestrian pushbuttons. A TCD may communicate with remote resources to help identify faults. The remote resources may include computer systems, which may be configured to interact with human resources such as crowdsourced resources. A TCD's communications with the remote resources may go through vehicle computers and smart phones of vehicles' occupants and pedestrians. A TCD may emit signals to enable vehicle computers to improve accuracy of position location. A TCD may emit its state and time-to-state-change information, in real or substantially real time. A vehicle computer may receive the state and/or time to state changes and in response vary operation of the vehicle's power train.

20 Claims, 9 Drawing Sheets

(56) References Cited

U.S. PATENT DOCUMENTS

2020/0353932 A1\* 11/2020 Wang ................ G08G 1/04
2021/0179135 A1\* 6/2021 Ahn ................ G01C 21/3415
2022/0073106 A1\* 3/2022 Ahn ................ H04W 4/40

\* cited by examiner

SMART TRAFFIC CONTROL DEVICES AND BEACONS, METHODS OF THEIR OPERATION, AND USE BY VEHICLES OF INFORMATION PROVIDED BY THE DEVICES AND BEACONS

CROSS-REFERENCE TO RELATED APPLICATIONS

This application is a continuation-in-part of and claims priority to U.S. patent application Ser. No. 17/039,885, entitled SMART TRAFFIC CONTROL DEVICES AND BEACONS, METHODS OF THEIR OPERATION, AND USE BY VEHICLES OF INFORMATION PROVIDED BY THE DEVICES AND BEACONS, filed Sep. 30, 2020, now U.S. Pat. No. 11,685,376; which is a continuation of and claims priority to U.S. patent application Ser. No. 16/112,743, entitled SMART TRAFFIC CONTROL DEVICES AND BEACONS, METHODS OF THEIR OPERATION, AND USE BY VEHICLES OF INFORMATION PROVIDED BY THE DEVICES AND BEACONS, filed Aug. 26, 2018, now U.S. Pat. No. 10,836,393; which claims priority to U.S. Provisional Patent Application Ser. No. 62/596,891, entitled SMART TRAFFIC CONTROL DEVICES, METHODS OF THEIR OPERATION, AND USE BY VEHICLES OF INFORMATION PROVIDED BY THE DEVICES, filed Dec. 10, 2017; each of the above-referenced patent documents is hereby incorporated by reference in its entirety as if fully set forth herein, including Specification, Figures, Claims, and all other matter.

FIELD OF THE DISCLOSURE

This disclosure relates generally to the field of smart traffic control devices, beacons for distance measurement and location services, the use of signals emanated by the beacons, and power train management in vehicles. Selected of the disclosed examples relate to fault diagnosing, reporting, monitoring, mitigating, and correcting by traffic control devices; to power train control of vehicles communicating with traffic control devices, including control of braking, accessory operation, and charging through regenerative braking; to speed management of vehicles communicating with traffic control devices; to vehicle position location techniques; to communications between smart traffic control devices and remote facilities; and to related vehicular and traffic control and management technologies.

BACKGROUND

A need in the art exists for improved vehicle power trains and techniques for managing vehicle power trains. A need in the art exists for improved traffic control devices and traffic control device fault diagnosing, monitoring, reporting mitigating, and correcting. A need in the art exists for improved techniques for accurate estimation of locations of vehicles and other assets/articles. A need in the art exits for improved communications with and between automotive technology devices, including traffic control devices, beacons, roadside units ("RSU") in Vehicular Ad hoc Networks ("VANET"s), and smart street light cameras and similar street/roadside devices.

SUMMARY

This document describes embodiments, variants, implementations, and examples effectuating novel techniques for addressing one or more of the needs identified above, and/or other needs. Selected embodiments described in this document include methods, apparatus, and articles of manufacture that enable enhanced operations of smart traffic control devices, beacons, vehicle computers, vehicular power trains; and enhanced distance measurement and location estimation techniques.

In an embodiment, a traffic control device ("TCD") includes a processing module, storage, camera(s), visual traffic control display(s), radio frequency transceiver(s), interface(s) to state-affecting sensor(s), and bus(es) coupling the processing module to the storage, the camera(s), the visual traffic control display(s), the radio frequency transceiver(s), and the interface(s) to the state-affecting sensor(s). The processing module implements a state machine to control traffic e.g., through the visual traffic control display(s). The processing module is configured to communicate with remote resource(s). The processing module and the remote resource(s) are configured to implement means for identifying false green request(s).

In an embodiment, a method of operating a traffic control device includes a number of steps. The traffic control device includes a processing module, storage camera(s), visual traffic control display(s), radio frequency transceiver(s), interface(s) to state-affecting sensor(s), and a bus (or buses) coupling the processing module to the storage, the camera(s), the visual traffic control display(s), the radio frequency transceiver(s), and the interface(s) to the state-affecting sensor(s). The processing module is configured to communicate with a remote resource. The method steps include: operating a state machine controlling traffic, e.g., through the visual traffic control display(s); and step for identifying false: green request(s).

In an embodiment, an article of manufacture includes at least one non-volatile machine-readable storage medium with program code stored in the at least one non-volatile machine-readable storage medium. When the program code is executed by (a) a processing module of a traffic control device that includes the processing module, storage, camera(s), visual traffic control display(s), radio frequency transceiver(s), interface(s) to state-affecting sensor(s); and (b) one or more processors of a remote resource, the program code configures the processing module and the one or more processors to operate a state machine controlling traffic in the vicinity of the traffic control device: and to perform steps for identifying false green requests in the traffic control device.

In an embodiment, a traffic control device includes a processing module, storage, camera(s), visual traffic control display(s), radio frequency transceiver(s), interface(s) to state-affecting sensor(s), and a bus (or buses) coupling the processing module to the storage, the camera(s), the visual traffic control display(s), the radio frequency transceiver(s), and the interface(s) to the state-affecting sensor(s). The processing module implements a state machine to control traffic. The processing module is also configured to communicate with a remote resource. The processing module and the remote resource are configured to implement means for detecting and verifying unidentified true green requests.

Another embodiment is a method of operating a traffic control device including a processing module storage camera(s), visual traffic control display(s), radio frequency transceiver(s), interface(s) to state affecting sensor(s), and a bus (or buses) coupling the processing module to the storage, the camera(s), the visual traffic control display(s), the radio frequency transceiver(s), and the interface(s) to the state affecting sensor(s). The processing module is configured to communicate with a remote resource. The method includes: operating a state machine controlling traffic: and steps for detecting and verifying unidentified true green requests.

Another embodiment is an article of manufacture including at least one non-volatile machine-readable storage medium with program code stored in the at least one non-volatile machine-readable storage medium. When the program code is executed by (a) a processing module of a traffic control device that includes the processing module, storage, camera(s), visual traffic control display(s), radio frequency transceiver(s), interface(s) to state-affecting sensor(s), and by (b) one or more processors of a remote resource, the program code configures the processing module and the one or more processors to operate a state machine controlling traffic in the vicinity of the traffic control device, and to perform step for detecting and verifying unidentified true green requests in the traffic control device.

In an embodiment, a traffic control device includes a processing module, storage, camera(s), visual traffic control display(s), radio frequency transceiver(s), interface(s) to state-affecting sensor(s), and a bus or buses coupling the processing module to the storage, the camera(s), the visual traffic control display(s), the radio frequency transceiver(s), and the interface(s) to the state-affecting sensor(s). The processing module implements a state machine to control traffic. The processing module is configured to cause the traffic control device to implement means for communicating with a remote resource through vehicles passing in the vicinity of the traffic control device.

Another embodiment is a method of operating a traffic control device including a processing module, storage, camera(s), visual traffic control display(s), radio frequency transceiver(s), interface(s) to state-affecting sensor(s), and a bus or buses coupling the processing module to the storage, the camera(s), the visual traffic control display(s), the radio frequency transceiver(s), and the interface(s) to the state affecting sensor(s). The method includes operating a state machine controlling traffic; and step for communicating with a remote resource through vehicles passing in the vicinity of the traffic control device.

Another embodiment is an article of manufacture including at least one non-volatile machine-readable storage medium with program code stored in the at least one non-volatile machine-readable storage medium. When the program code is executed by (a) a processing module of a traffic control device including a processing module, storage, camera(s), visual traffic control displays), radio frequency transceiver(s), interface(s) to state-affecting sensor(s), and a bus or buses coupling the processing module to the storage, the camera(s), the visual traffic control display(s), the radio frequency transceiver(s), and the interface(s) to the state-affecting sensor(s), and by (b) one or more processors of a remote resource, the program code configures the traffic control device and the remote resource to operate a state machine controlling traffic in the vicinity of the traffic control device; and to perform step for communicating between the traffic control device and the remote resource through vehicles passing in the vicinity of the traffic control device.

In an embodiment, a traffic control device includes a processing module, storage, camera(s), visual traffic control display(s), radio frequency transceiver(s), interface(s) to state-affecting sensor(s), and a bus or buses coupling the processing module to the storage, the camera(s), the visual traffic control display(s), the radio frequency transceiver(s), and the interface(s) to the state-affecting sensor(s). The processing module implements a state machine to control traffic in the vicinity of the traffic control device. The processing module is configured to cause the traffic control device to implement means for enabling vehicles and other devices in the vicinity of the traffic control device to estimate distance to the traffic control device by measuring phase shifts of at least three frequencies emitted by the traffic control device.

Another embodiment is a method of operating a traffic control device including a processing module, storage, camera(s), visual traffic control display(s), radio frequency transceiver(s), interface(s) to state-affecting sensor(s), and a bus or buses coupling the processing module to the storage, the camera(s), the visual traffic control display(s), the radio frequency transceiver(s) and the interface(s) to the state-affecting sensor(s). The method includes operating a state machine to control traffic in the vicinity of the traffic control device; and step for enabling vehicles and other devices in the vicinity of the traffic control device to estimate distance to the traffic control device by measuring phase shifts of at least three frequencies emitted by the traffic control device.

Another embodiment is an article of manufacture including at least one non-volatile machine-readable storage medium with program code stored in the at least one non-volatile machine-readable storage medium. When the program code is executed by a processing module of a traffic control device including the processing module, storage, camera(s), visual traffic control display(s), radio frequency transceiver(s), interface(s) to state-affecting sensor(s), and a bus or buses coupling the processing module to the storage, the camera(s), the visual traffic control display), the radio frequency transceiver(s), and the interface(s) to the state-affecting sensor(s), the program code configures the traffic control device to perform steps including: operating a state machine to control traffic in the vicinity of the traffic control device; and step for enabling vehicles and other devices in the vicinity of the traffic control device to estimate distance to the traffic control device by measuring phase shifts of at least three frequencies emitted by the traffic control device.

In an embodiment, a traffic control device includes a processing module, storage, camera(s), visual traffic control display(s), radio frequency transceiver(s), interface(s) to state-affecting sensor(s), and a bus or buses coupling the processing module to the storage, the camera(s), the visual traffic control display(s), the radio frequency transceiver(s), and the interface(s) to the state-affecting sensor(s). The processing module implements a state machine to control traffic in the vicinity of the traffic control device. The processing module is configured to cause the traffic control device to transmit in real time states) of the traffic control device in one or more directions of traffic movement controlled by the traffic control device. In variants, the processing module is further configured to cause the traffic control device to transmit in real time wait times to changes in the states. In variants, the processing module is configured to cause the traffic control device to transmit in real time indications of likelihood of the wait times to the changes in the states.

In an embodiment, a method of operating a traffic control device including a processing module, storage, camera(s), visual traffic control display(s), radio frequency transceiver(s), interface(s) to state-affecting sensor(s), and a bus or buses coupling the processing module to the storage, the camera(s), the visual traffic control display(s), the radio frequency transceiver(s), and the interface(s) to the state-affecting sensor(s) includes the following steps: implementing a state machine to control traffic in the vicinity of the traffic control device; and transmitting in real time state(s) of the traffic control device in one or more directions of traffic movement controlled by the traffic control device. In variants, the method further includes transmitting, in real time, wait times to changes in the states. In variants, the method further includes transmitting, in real time, indications of likelihood of the wait times to the changes in the states.

Another embodiment is an article of manufacture including at least one non-volatile machine-readable storage medium with program code stored in the at least one non-volatile machine-readable storage medium. When the program code is executed by a processing module of a traffic control device that includes the processing module, storage, camera(s), visual traffic control display(s), radio frequency transceiver(s), interface(s) to state-affecting sensor(s), and a bus coupling the processing module to the storage the camera(s), the visual traffic control display(s), the radio frequency transceiver(s), and the interface(s) to the state-affecting sensor(s), the program code configures the traffic control device to: (a) implement a state machine to control traffic in vicinity of the traffic control device; and (b) transmit in real time states of the traffic control device in one or more directions of traffic movement controlled by the traffic control device. In variants, the program code further configures the traffic control device to transmit, in real time, wait times to changes in the states. In variants, the program code further configures the traffic control device to transmit, in real time, indications of likelihood of the wait times to the changes in the states.

In an embodiment, a traffic control device includes: a processing module, storage, one or more cameras, one or more visual traffic control displays, one or more interfaces to state-affecting sensors, one or more remote interfaces to one or more remote computer systems, and one or more buses coupling the processing module to the storage, the one or more cameras, the one or more visual traffic control displays, the one or more interfaces to the state affecting sensors, and the one or more remote interfaces.

The processing module is configured to: implement a state machine to control traffic through the one or more visual traffic control displays; obtain a preliminary false green request (FGR) detection; identify one or more locations that correspond to the preliminary FGR detection; obtain through the one or more cameras one or more recordings of the one or more locations, the one or more recordings corresponding to time a green request (GR) associated with the preliminary FGR detection was generated (first generated and/or continued to be generated); perform first machine-processing of GR-related data that includes the one or more recordings, to attempt to determine whether the preliminary FGR detection corresponds to a real GR; if the first machine-processing indicates that the preliminary FGR detection resulted from the real GR, clear the preliminary FGR detection (and resume or continue normal operation); if the first machine-processing does not indicate that the preliminary FGR detection resulted from the real GR, transmit through the one or more remote interfaces to the one or more remote computer systems information regarding events that caused the preliminary FGR detection, the information including at least some of the GR-related data, the at least some of the GR-related data including the one or more recordings; and clear the preliminary FGR detection (and resume or continue normal operation of the state machine), in response to receipt by the TCD of a clear signal from the one or more remote computer systems.

The one or more remote computer systems are configured to receive the information from the TCD; perform additional processing of the information to attempt to determine whether the preliminary FGR detection corresponds to the real GR or an FGR; and, if the additional processing indicates the preliminary FGR detection resulted from the real GR, transmit the clear signal to the TCD to cause the TCD to clear the preliminary FGR detection.

In aspects, a traffic management system includes the TCD, and, the one or more remote computer systems. The processing module is further configured to adjust operation of the state machine to mitigate fault associated with the FGR (such operate without regard to the reading of a state-affecting sensor found to be faulty), in response to receipt by the TCD of an adjust signal from the one or more remote computer systems. The one or more remote computer systems are further configured to transmit the adjust signal to the TCD to cause the TCD to adjust operation of the state machine to mitigate the fault associated with the FGR, if the additional processing indicates the preliminary FGR detection resulted from the FGR.

In aspects, the additional processing includes second machine-processing any the one or more remote computer systems.

In aspects, the additional processing includes engaging, from the one or more remote computer systems one or more human resources to perform human processing.

In aspects, the additional processing includes engaging from the one or more remote computer systems one or more human resources to perform crowdsourced resource-processing.

In aspects, the one or more interfaces to state-affecting sensors include an interface to a pedestrian pushbutton.

In aspects, the processing module is further configured to perform the first machine-processing of the one or more recordings by searching the one or more recordings for presence of a pedestrian.

In aspects, the one or more interfaces to state-affecting sensors include an interface to a vehicle sensor (i.e., a sensor that senses presence of a vehicle).

In aspects, the one or more interfaces to state-affecting sensors include an interface to an inductive loop vehicle sensor, and the processing module is further configured to perform the first machine-processing of the one or more recordings by searching the one or more recordings for presence of a vehicle.

In aspects, the one or more remote computer systems are further configured to perform the additional processing, by searching the one or more recordings for presence of a pedestrian or a vehicle.

In aspects, the one or more recordings include infrared recording(s) and/or ultraviolet recording(s).

In aspects, the one or more recordings include lidar output recording(s) and/or radar output recording(s).

In aspects, the TCD further includes a sound recording device, Me processing module is further configured to make sound recordings corresponding to the time the GR associated with the preliminary FGR detection was generated, and the at least some of the GR-related data further includes the sound recordings.

In aspects, the TCD includes one or more radio frequency receivers and one or more radio frequency transmitters, and the processing module is further configured to connect through the one or more radio frequency receivers and, the one or more radio frequency transmitters to mobile devices in the vicinity of the TCD to obtain additional recordings of the one or more locations, and the at least some of the GR-related data that includes the additional recordings.

In aspects, the TCD includes one or more radio frequency receivers and one or more radio frequency transmitters, and the TCD and the one or more remote computer systems are further configured to implement the one or more remote interfaces to include means for communication between the TCD and the one or more remote computer systems via vehicles and/or mobile devices passing in the vicinity of the TCD.

In aspects, the TCD and the one or more remote computer systems are further configured to implement means for detecting and verifying unidentified true green requests.

In aspects, the TCD includes a radio frequency transmitter (which may but need not be part of the one or more remote interfaces), and the TCD is further configured to implement beacon means for facilitating distance measurement between a point (e.g., in the vicinity of the TCD and the TCD using transmissions of a radio frequency carrier modulated with at least three low frequencies and measurement of at least two phase differences of the at least three low frequencies at the point.

In aspects, an apparatus includes a TCD and a vehicle computer. The vehicle computer includes a processor and a vehicle radio frequency receiver that enables the vehicle computer to receive the transmissions of the radio frequency carrier modulated with the at least three low frequencies and measure the at least two phase differences between among the at least three low frequencies. The processor implements means for measuring distance to the TCD based on the at least two phase differences.

In aspects, the TCD further includes a radio frequency transmitter coupled to the processing module by the one or more buses; and the processing module is further configured to cause the TCD to transmit in real time through the radio frequency transmitter state information describing current state of the one or more visual traffic control displays and time to changes in the state of the one or more visual traffic control displays. A vehicle power train control system may include the traffic management system and a vehicle computer configured to control power train functions of a vehicle. The vehicle computer includes a processor and a vehicle radio frequency receiver that enables the vehicle computer to receive the state information and the time to changes in the state, and to vary operation of power train of the vehicle in response to changes in the state and/or changes in the time to changes in the state.

In an embodiment, a method of running (e.g., operating, performing/executing functions of) traffic control systems includes: operating a state machine to control traffic through one or more visual traffic control displays of a traffic control device (TCD); recognizing a preliminary false green request (FGR) detection of the TCD; identifying one or more locations that correspond to the preliminary FGR detection; obtaining through one or more cameras one or more images of the one or more locations, the one or more images corresponding to time a green request (GR) associated with the preliminary FGR detection was generated; first machine-processing of GR-related data that includes the one or more images, to attempt to determine whether the preliminary FGR detection corresponds to a real GR; and clearing the preliminary FGR detection to continue normal operation of the state machine, in response to the first machine-processing indicating that the preliminary FGR detection resulted from the real GR.

In aspects, the method also includes transmitting to one or more remote computer systems information regarding events that caused the preliminary FGR detection, in response to the first machine-processing not indicating that the preliminary FGR detection resulted from the real GR, wherein the information includes at least some of the GR-related data, the at least some of the GR-related data that includes the one or more images.

In aspects, the step of recognizing includes identifying a particular GR signaling, (being active) continuously longer than a predetermined length of time.

In aspects, the step of recognizing includes identifying, a particular GR signaling (being active) continuously longer than a predetermined length of time, and the method also includes varying the predetermined length of time as a function of calendar and time attributes.

In aspects, the step of recognizing includes identifying a particular GR signaling (being active) continuously longer than a predetermined length of time, and the method also includes varying the predetermined length of time as a function of calendar attributes and local event attributes.

In aspects, the method also includes setting a length of time to a default value and then varying the length of time in response to statistics of at least one of a) actual traffic iii vicinity of the TCD and b) green requests at the TCD; wherein the step of recognizing includes identifying a particular GR signaling (being active) continuously longer than the length of time.

In aspects, the method also includes setting a length of time to a default value and then varying the length of time in response to statistics of at least one of a) actual traffic in vicinity of the TCD, b) green requests at the TCD, c) actual traffic in vicinity of another TCD, and d) green requests at one or more other TCDs; wherein the step of recognizing includes identifying a particular GR signaling (being active) continuously longer than the predetermined length of time.

In aspects, the step of recognizing includes identifying a particular GR signaling (being active) intermittently more than a predetermined percentage of time. The predetermined percentage of time may be determined before the step of recognizing and may be greater by a factor of two or more than percentage of time of statistical expectation of the particular GR signaling based on calendar and time attributes.

In aspects, the method also includes additional processing of the information by the one or more remote computer systems to attempt to determine whether the preliminary FGR detection corresponds to the real GR or an FGR; generating a clear signal in response to the additional processing indicating that the preliminary FGR detection resulted from the real GR; and clearing the preliminary FGR detection in response to receipt of the clear signal by the TCD.

In aspects, the method also includes transmit the fear signal from the one or inure remote computer systems to the TCD; wherein the steps of additional processing and generating the clear signal are performed by the one or more remote computer systems, and the step of clearing is performed by the TCD.

In aspects, the method also includes transmitting an adjust signal from the one or more remote computer systems to the TCD in response to the additional processing indicating the preliminary FGR detection resulted from the FGR; and adjusting operation of the state machine to mitigate fault associated with the FGR, in response to receipt by the TCD of the adjust signal from the one or more remote computer systems.

In aspects, the step of additional processing includes second machine-processing of the one or more images by the one or more remote computer systems, and the step of additional processing does not include human processing of the one or more images.

In aspects, the step of additional processing includes engaging by the one or more remote computer systems one or more human resources to perform human processing, of the one or more images. The human processing may be crowdsourced processing.

In aspects, the step of performing first machine-processing includes searching the one or more images for presence of a pedestrian or a vehicle.

In aspects, the step of additional processing includes searching the one or more images for presence of a pedestrian or a vehicle.

In an embodiment, a method of running (e.g., operating, performing/executing functions raffle control systems includes operating a state machine to control traffic through one or more visual traffic control displays of a traffic control device (TCD); recognizing a preliminary undetected true green request (UTGR) occurrence; identifying one or more locations that correspond to the preliminary UTGR occurrence; obtaining through one or more cameras one or more images of the one or more locations, the one or more images corresponding to a time period during which at least one true green request (TGR) originated from the one or more locations was expected to take place at the TCD but no green request (GR) originated from the one or more locations was detected by the TCD: first machine-processing of GR-related data that includes the one or more images, to attempt to determine whether a GR occurred: and transmitting to one or more remote computer systems information regarding events that caused the preliminary UTGR occurrence, in response to the first machine-processing indicating that a GR took place during the time period, the information including the one or more images.

In aspects, the method also includes adjusting operation of the state machine to mitigate a fault associated with the preliminary UTGR occurrence, in response to the first machine-processing indicating that the GR took place during, the time period.

In aspects, the step of recognizing the preliminary UTGR occurrence includes sensing non-receipt of a GR for a continuous period of time longer than a predetermined time duration, from a sensor at the one or more locations, the sensor being configured to provide green requests to the TCD; and the method also includes resuming normal operation of the state machine in response to at least one event selected from the group consisting of receiving from the remote facility a notification to resume normal operation and detecting a state change of the particular sensor.

In an embodiment, a method of diagnosing of a computer-based traffic control system includes recording one or more images of at least one visual traffic control display (VTCD) of a traffic control device (TCD) of the computer-based traffic control system during a diagnostic period, by the computer-based traffic control system; obtaining (e.g., recording registering, otherwise making available for concurrent and/or later comparison) one or more expected states of the TCD during the diagnostic period, by the computer-based traffic control system; processing, the one or more images to identify one or more actual VTCD states during the diagnostic period, by the computer-based traffic control system; comparing the one or more actual VTCD states with the one or more expected states to determine whether a mismatch exists between contemporaneous actual and expected states, by the computer-based traffic control system; and performing a corrective action in response to the mismatch, by the computer-based traffic control system. The step of recording the one or more images is performed by a camera external to the TCD.

In an embodiment, a method of diagnosing traffic control systems includes recording one or more images of a visual traffic control display (VTCD) of a traffic control device (TCD) of a computer-based traffic control system, during a diagnostic period; obtaining one or more expected states of the VTCD during the diagnostic period; processing the one or more images to identify one or more actual VTCD states during the diagnostic period, by the computer-based traffic control system; and comparing the one or more actual VTCD states with the one or more expected states to determine whether a mismatch exists between the actual states of the VTCD and the expected states of the VTCD that are contemporaneous with the actual states of the VTCD. The step of recording is performed by a camera external to the TCD. The camera may be part of a camera-equipped device external to the TCD. The method may include operating a state machine of the TCD to control traffic through one or more visual traffic control displays of the TCD, the one or more visual traffic control displays comprising the VTCD.

In aspects, the method also includes monitoring power consumed by the VTCD to determine whether power consumed by the VTCD is below a first predetermined power threshold; and varying the first predetermined power threshold depending on expected power consumption of the VTCD during current state of the state machine. At least one of the steps of recording the one or more images, obtaining the one or more expected states, processing the one or more images, and comparing is performed in response to the power consumed by the VTCD falling below the first predetermined power threshold.

In aspects, the method includes monitoring power consumed by the VTCD to determine whether power consumed by the VTCD is above a second predetermined power threshold; and varying the second predetermined power threshold depending on expected power consumption of the VTCD during current state of the state machine. At least one of the steps of recording the one or more images, obtaining the one or more expected states, processing the one or more images, and comparing is performed in response to the power consumed by the VTCD exceeding the second predetermined power threshold.

In aspects, the method includes monitoring traffic flow through an intersection controlled by the TCD to detect a predetermined irregularity in the traffic flow, and at least one of the steps of recording the one or more images, obtaining the one or more expected states, processing the one or more images, and comparing is performed in response to detection of the predetermined irregularity. The predetermined irregularity may be varied based at least on one of calendar, time, and local events attributes.

In aspects, the method also includes receiving at the TCD a diagnosing trigger signal (DTS). The step of obtaining the one or more expected states is performed in response to receipt of the DTS by the TCD.

In aspects, at least one of the steps of processing the one or more images, comparing, and performing the corrective action is performed by a remote facility of one or more computer systems, at least one of the one or more computer system being remote from the TCD.

In aspects, the step of comparing is performed by the TCD.

In aspects, the step of recording the one or more images is performed by the camera-equipped device external to the TCD.

In aspects, the method also includes sending a request for the one or more images from the TCD to the camera device external to the TCD.

In aspects, the method also includes sending a request for the one or more images from a remote facility to the camera-equipped device external to the TCD, the remote facility comprising at least one computer system remote to the TCD.

In aspects, the camera-equipped device external to the TCD is a mobile d a person in vicinity of the TCD.

In aspects, the camera external to the TCD is installed in a vehicle in vicinity of the TCD.

In aspects, the one or more images are captured and transmitted to at least one of the TCD an a computer system remote to the TCD, in real time.

In aspects, the method also includes performing a corrective action in response to the mismatch, by the TCD, the step of performing the corrective action comprising sending to a remote facility a notification regarding a malfunction indicated by the mismatch and/or performing a mitigating action in response to the mismatch, by the TCD, the step of performing the mitigating, action comprising adjusting the state machine to mitigate a malfunction indicate by the mismatch.

In an embodiment, a traffic control devices (TCD) includes a processing module, storage, a visual traffic control display (VTCD), one or more interfaces to one or more remote computer systems and to a camera-equipped device external to the TCD and one or more connections coupling the processing module to the storage, the VTCD, the one or more interfaces, and the one or more remote interfaces, wherein the processing module is configured to: acquire one or more images of the VTCD during a diagnostic period, from the camera-equipped device external to the TCD obtain one or more expected states of the VTCD during the diagnostic period; process the one or more images to identify one or more actual VTCD states of the VTCD during the diagnostic period; and compare the one or more actual VTCD states of the VTCD with the one or more expected states of the VTCD to determine whether a mismatch exists between contemporaneous actual and expected states of the VTCD.

Various features and aspects will be better understood with reference the following description, drawings, and appended claims.

DETAILED DESCRIPTION

Figure 1:
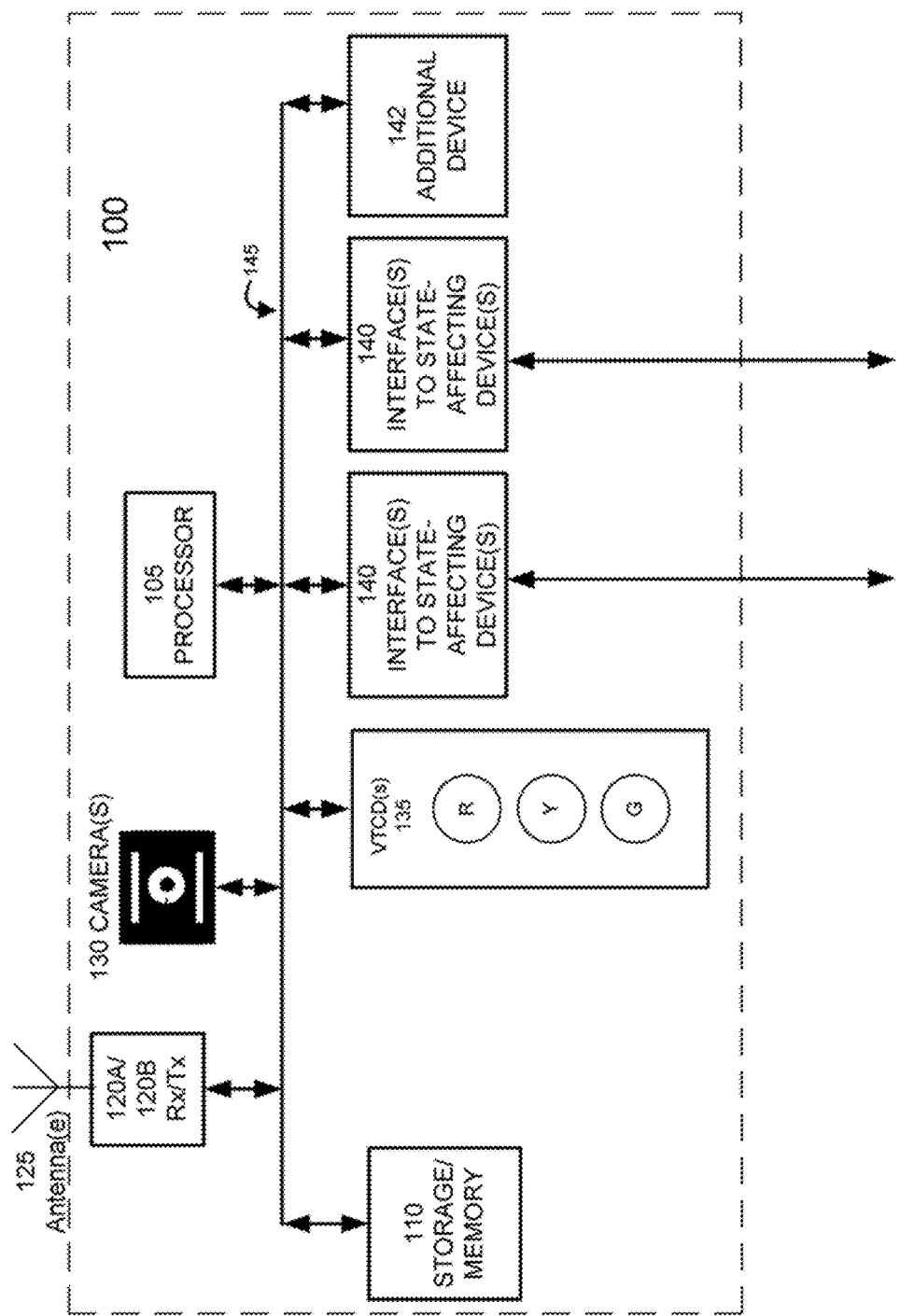
FIG. 1 illustrates selected components of a traffic control device configured in accordance with selected features described in his document.

The words "embodiment," "variant," "example," "implementation." and similar words and expressions as used in this document refer to a particular apparatus, process, article of manufacture, or part of apparatus/process/article of manufacture, and not necessarily to the same apparatus, process, article of manufacture, or part thereof. Thus, "one embodiment" (or a similar word/expression) used in one place or context may refer to a particular apparatus, process, article of manufacture, or part thereof; the same or a similar expression in a different place or context may refer to a different apparatus, process, article of manufacture, or part thereof. The expression "alternative embodiment" and similar words and phrases are used to indicate one of a number of different possible embodiments, variants, examples, or implementations. The number of possible embodiments, variants, examples. Or implementations is not necessarily limited to two or any other quantity. Characterization of an item as "exemplary" or listing an item following "for example," "for instance," or similar expressions means that the item is used for illustration. Such characterization does not necessarily mean that the embodiment, variant, example, implementation, or part thereof is a preferred one; the embodiment, variant, implementation, example, or part thereof may but need not be a currently-preferred embodiment, variant, implementation, example, or part thereof. All embodiments, variants, implementations, and examples are described for illustration purposes and are not necessarily strictly limiting.

The words "couple," "connect," and similar words/ phrases/expressions with their inflectional morphemes do not necessarily import an immediate or direct connection, but include within their meaning connections through mediate elements. Unless otherwise noted or is clear from the context, devices may be couple disconnected wirelessly, optically, and in a conventional wired manner. Connections may include buses and various network(s), including local area networks (LANs) and wide area networks (WANs) such as the Internet.

"Red," "green," and "yellow" have their conventional meaning in the context of traffic control devices (traffic lights etc.). Now that "yellow" in this context may actually be amber, and "green" may be turquoise.

The expression "processing logic" should be understood as selected steps/decision blocks and/or hardware/software/ firmware for implementing the selected steps/decision blocks. "Decision block" means a step in which a decision is made based on some condition, and subsequent process flow is directed based on whether the condition is met or not met.

A camera of a camera-equipped device is "external" to a particular traffic control device in the sense that it is at such a distance from the traffic control device that it can monitor visually the state of a display of the traffic control device; the camera-equipped device with such external camera may be referred to as an "external camera-equipped device" relative to the traffic control device. Typically, an external camera is >25 feet/7.62 meters away from the display, but within 1000 feet 04.8 meters of the traffic control device. Also typically, the camera is outside of the enclosure of the traffic control device which it monitors. The TCD's enclosure, however, may be extended to receive the camera installation, in which case such enclosure extension would typically extend six or more feet (1.83 meters, and preferably more than ten feet or 3.048 meters) away from the monitored visual traffic control display of the TCD).

A camera of a camera-equipped device is a "nearby camera" and the device is a "nearby device" relative to a particular traffic control device if it is not part of the traffic control device, it is placed so that it has a view of the locations from which green requests directed to the traffic control device are expected to be generated in the course of normal operation of the traffic control device. Green requests are explained below. A location from which a pedestrian pushbutton of the traffic control device can be activated, for example, is a location from which green requests directed to the traffic control device are expected to be generated. As another example, a location within the sensory range of an inductive loop traffic sensor (or another type of vehicle sensor) of the traffic control device is such location as well. It may be for example, an RSV camera, a beacon camera, a camera of another TCD in the area, a camera installed in a vehicle passing through or near the intersection controlled by the TCD 100, a camera in a "mobile device" of a pedestrian nearby (e.g., in the vicinity), a camera of a mobile device of a person in a vehicle passing, through or near (e.g., in the vicinity of) the intersection, a stand-alone camera with communication capability such as a street light camera.

A "mobile device" equipped with a camera or a "camera-equipped" "mobile device" is a portable camera-equipped electronic device that can ordinarily be carried by a person. Examples of such mobile devices include smartphones, tablets, mobile PCs, portable navigation devices, portable gaming devices, smart watches, and smart glasses.

Two or more directions controlled by a traffic control device are "conflicting" when the traffic control device may not safely allow traffic, whether pedestrian or vehicular, to flow in the two or more directions at the same time. Suppose, for example, that the traffic control device controls a four-way intersection (no overpasses) with North-to-South, South-to-North, East-to-West, and West-to-East traffic flows. The North-to-South vehicular traffic flow need not conflict with the South-to-North traffic flow, but will conflict with both East-to-West and West-to-East traffic flows. Additionally, the North-to-South vehicular traffic flow may conflict with vehicular traffic approaching from South and waiting to make a left turn towards West; and with pedestrian traffic waiting to cross the North-South roadway. These are of course merely examples, and conflict between and among different directions may be programmed differently, for example, showing a red "DO NOT CROSS" or "DO NOT WALK" or "STOP" display to prohibit pedestrians from crossing in any direction when any vehicular traffic is allowed (by a green light, for example) through the intersection in any direction. Similarly, right turn may be allowed (perhaps after a stop) from a lane that may not cross the intersection. It is a matter of design of the intersection and choice of operating procedures programmed into the state machine of the traffic control device, which, of course, should not be nonsensical in the real world.

The expression "finite-state machine" (or simply "state machine") in this document has its ordinary meaning in the art. A state machine is defined by a finite number of states and rules-based transitions between/among the states in response to the passage of time and/or in response to external stimuli. A state is the status of a system (generally, a traffic control device in this document) that is waiting to execute a transition. A transition is one or more actions of the system executed when a condition is fulfilled and/or when an event is received. In a traffic control device, an action may correspond to one or more displays illuminated or darkened or caused to blink, for example. Moreover, in a traffic control device an action may be beginning of a countdown (waiting period) to another action or transition, which other action/transition may be a change in one or more displays. "Operating a state machine" of a traffic control device generally means executing the transitions between the states of the traffic control device.

A "green request" or "GR" is a signal informing a traffic control device that some entity (e.g., a pedestrian, a vehicle) needs to proceed in a particular direction (and consequently to prevent flow of traffic in the conflicting direction(s)). For example, detection of a vehicle in a particular lane is a GR to proceed in a particular direction that is associated with the lane, such as proceed forward, proceed with a left turn, or proceed with a right turn. As another example, activation of (pressure on) a pedestrian crossing pushbutton is a GR to change the state of a pedestrian control display to WALK (or equivalent/analogous display) in the direction associated with the pushbutton, i.e., the direction in which the pedestrian signals that the pedestrian wishes to proceed/cross (and consequently to prevent vehicular traffic flow across the pedestrian walkway that is associated with the pushbutton. An unambiguous GR indicates traffic (whether vehicular or pedestrian) proceeding or waiting to proceed in a particular direction. An inductive loop signal indicating a vehicle in a center lane of an intersection where turns from the center lane are prohibited is an unambiguous GR; an inductive loop signal indicating a vehicle in a right (or left) lane of an intersection where turns from the right (or left) lane are allowed but not required is an ambiguous GR, because the vehicle may proceed forward or turn; an inductive loop signal indicating a vehicle in a center lane of an intersection where right turns from the center lane are allowed but not required is also an ambiguous GR; receipt of an emergency preemption signals may be ambiguous or unambiguous, depending on the details (whether or not a particular direction is indicated) provided by such signals and the treatment of such signals by the TCD. Often, however, an emergency preemption signal is an unambiguous green request, telling the traffic control device to disallow traffic in all directions; no green light need be associated with an emergency preemption signal, because emergency traffic with a siren may be able to proceed lawfully against a red light.

A malfunction causing a continuous (or periodic, or even merely occasional) reporting of a request for a permission to proceed in a given direction without actual traffic (whether vehicular or pedestrian) causing the request is a "false green request" or "false GR" "FGR." Examples of false green requests include: a stuck pushbutton of a pedestrian crossing and an inductive loop sensor malfunction that produces an unwarranted vehicle detected signal (such as a continuous or an intermittent vehicle detected signal). A proper vehicle detected signal due to a vehicle that stays near an inductive loop for a prolonged time (such as an illegally parked vehicle, broken down vehicle, maintenance vehicle for work in the immediate vicinity of the TCD, etc.) is also an FGR cause, though the "malfunction" here exists in the sense of an irregular condition that appears to indicate a need for some corrective action. Other examples include emergency preemption request signals (as explained above) sent from malfunctioning or maliciously operated emergency vehicle operator devices or from other devices that create interference mistaken by the TCD for emergency preemption request signals, and otherwise improperly arisen/detected emergency preemption signals.

Thus, fake green requests may be generated by a temporary condition which is expected to clear by itself and is not caused by a malfunction of the TCD and its sensors, such as an improperly parked or a disabled vehicle, or a maintenance work vehicle parked in a traffic lane; such false green requests are "soft." False green requests may also be generated by a device malfunction that is not expected to clear by itself, at least not within a reasonable or foreseeable time, such as a malfunction of a sensor (e.g., pushbutton inductive loop), malfunction in the TCD itself (e.g., had operation of one of the interfaces to external devices/sensors or other hardware of software failures of the TCD). Such false green requests are "hard," Additionally, false green requests may also be af unknown origin or otherwise not being easily susceptible to classification as to the ability to clear by themselves within a reasonable tune (e.g., under one, two, three, four, five days, or even several weeks or months). These include radio interference, including malfunctions in, or abuse of, emergency preemption request signal-generating devices. Such false green requests are "unknown" false green requests.

A false green request may be re-classified based on changing circumstances. For example, a stuck pushbutton may become unstuck and the false green request may clear. Similarly, radio interference may disappear or abate, and the initially-resulting unknown false green request may then also clear. As another example, an abandoned vehicle may initially result in a soft false green request, but after a predetermined period of time may be re-classified as either unknown, or hard false green request.

Another type of malfunction causes a legitimate request for a permission to proceed in a given direction (a "true green request" or "TCD") not to be reported to the TCD. For example, a pushbutton or an inductive loop malfunction can result in a TGR that is not reported to the TCD or otherwise not detected by the processing module (which may also operate the state machine) of the TCD. Such TGR may be referred to as "undetected TGR" or "UTGR," Another example of a UTGR cause is a malfunction in an interface of the TCD to external sensors, such as interfaces to pedestrian pushbuttons and inductive loops.

"Vicinity of a traffic control device" and analogous expressions signify the area within which the traffic control device controls traffic. Road way and pedestrian walkways within 25 meters of a TCD and leading to or away from the TCD may be considered to be in the vicinity of the TCD. In the contexts of (a) transmitting traffic signal state information and expected change in the state, and (b) distance measurement, the "vicinity" includes areas within reach of short and medium range communications of TCD transceivers (such as transceivers 120A/B described below).

In a number of places, this disclosure may refer to "video" and "still" images. Video and still images may be in the visible portion of the electromagnetic spectrum, infrared portion of the spectrum, ultraviolet portion of the spectrum, or any combination thereof, whether or not specifically mentioned in the context. Of course, the description and claims may specifically refer to a particular part or parts of the spectrum, and in the context of such references, the images are in the specific part or parts of the spectrum. Single form "image" and plural "images" are used interchangeably.

A server or a facility or a computer system (of one or more computers) that is "remote" to another item (such as a TCD/beacon) is distant from the item in the physical sense. The remote server/facility/computer system is not collocated with the item, as in the same enclosure or building. Typically, "remote" indicates a distance of one km (0.6 mile) or more, and may be 16 or more kms (10 miles), possibly more than 160 kms (100 miles) and even more than 1600 kms (1000 miles). In the case of a TCD being remote from a computer system of several computers, at least one (but not necessarily all) of these computers is remote to the TCD in the sense explained above in this paragraph; further, some or all of the computers of the system may also be remote from each other in the same sense. The computers may be networked, for example, using local or wide area networks. The computers) may also be connected via one or more networks to the TCD or another device from which it/they is/arc remote. As will be made clear, a remote server/facility/computer system may include (or have access to) processing resources additional to and/or of a character different from, the resources of the item. The additional processing resources may include human resources, which may be crowdsourced resources; the computer system may have an interface to such human/crowdsourced resources, and be configured to engage automatically such human/crowdsourced resources. While the interface to the human resources may form part of the remote server/facility/computer system, the human resources are not part of the remote server/facility/system.

Some definitions and clarifications have been explicitly provided above. Other and further explicit and implicit definitions and clarifications of definitions may be found throughout this document and the incorporated patent documents.

FIG. 1 illustrates selected components of a traffic control device or TCD 100 that may be configured in accordance with one or more features described in this document. The TCD 100 may be, for example, a traffic light. The TCD 100 includes a processing module 105. The TCD 100 also includes storage device(s) 110 (which may store program code for execution by the processing module 105, other program code, various data mentioned in this document, scratchpad data, as well as other data and code). The TCD 100 additionally includes one or more radio frequency (RF) receivers 120A and transmitters 120B. The RF receivers 120A may be configured to receive radio frequency signals; the RF transmitters 120B may be configured to transmit radio frequency signals; each RF receiver 120A and/or transmitter 120B may include its own processing module in addition to the processing module 105, and be controlled by its own processing module and/or by the processing module 105. The TCD 100 further includes one or more RF transmit and receive antennae 125 coupled to the receivers/transmitters 120A/120B; in embodiments, there is a single antenna that serves both to receive and transmit RF signals; in embodiments, there are several receive and transmit antennae. The TCD 100 further includes still and/or video cameras) 130. The TCD 100 further includes one or more visual traffic control displays ("VTCD"s) 135. The TCD 100 further includes one or more interfaces 140 to state affecting sensors, i.e., sensors that may affect the state of the TCD 100. The TCD 100 further includes one or more buses 145 that couple(s) the processing module 105 to some or all of the other components of the TCD 100, allowing the processing module 105 to read from and write to these devices, and/or otherwise to control operation of some or all of these devices. In embodiments, one or more additional buses interconnect the components (other than the processing module 105) directly, for example, for direct memory access of one of the other devices by another device of the TCD 100. In embodiments, some or all of the components of the TCD are connected to the processing, module without a conventional bus, for example, by direct connections. In embodiments, the components are interconnected by direct connections.

In embodiments, the TCD 100 includes additional components, such as an additional device 142, which components may be coupled to the processing module 105 through the bus(es) 145 or otherwise.

The processing module 105 may include, for example, one or more processors, such as microprocessors, dedicated processors, microcontrollers, and field-programmable devices (field-programmable gate arrays and similar field-configurable devices), and their supporting circuitry, such as DRAMs and other memories, with their memory controllers.

The storage device(s) 110 may include one or more Read Only Memories (ROMs), one or more Electrically Programmable ROMs (EPROMs), one or more Electrically Erasable Programmable ROMs (EEPROMs), magnetic storage devices (e.g., hard disk(s)), optical storage devices (e.g., CD-ROMs, DVD-ROMs), flash memories, and other forms of volatile and non-volatile storage media storage media may include volatile memory with battery back-up.

The RF receivers 120A and transmitters 120B may include cellular radio receivers and transmitters that enable the TCD 100 to communicate with other devices such as cellular networks and through them with smart cell phones, smart watches, smart glasses, tablets, gaming devices, navigation devices, and applications (apps) running on the cell phones/tablets/watches/glasses/gaming devices/navigation devices, the Internet, and other Internet-connected devices. The RE receivers 120A and transmitters 120B may include long-range RF receivers and transmitters that can communicate with other TCDs/RSUs, vehicle computers in vehicles, smart phones, tablets, smart watches/glasses, gaming devices, dedicated navigation devices, other mobile devices and apps running on these devices, over distances up to and over 100 meters. The RF receivers 120A and transmitters 120B may include medium range and short range RF receivers and transmitters that can communicate with vehicle computers in vehicles, smart phones, tablets, smart watches/glasses, gaming devices, dedicated navigation devices, other mobile devices, and other devices in distances up to about 100 meters in normal operation. The RF receivers 120A and transmitters 120B may include Bluetooth® devices and other devices with the same or substantially same range. One or more of the RF transmitters 120B may also emit beacon signals, which may but need not additionally carry payload information and location information such as coordinates of the TCD and TCD state information and time-to-change-of-state information, and serve for location and distance measurement of devices such as vehicles, mobile devices, and devices designed for distance measurement/location services.

The RF antennae 125 may be omnidirectional and substantially omnidirectional, horizontally-omnidirectional and substantially horizontally-omnidirectional; the antennae 125 may also be directional, including directional in three dimensions and/or directional in the horizontal plane (transmitting in a predetermined or adjustable azimuthal/compass direction over a range of altitude/elevation angles). The antennae 125 may include one or more antennae for operation on various frequencies. A single antenna may be used for receiving and/or transmitting on the same frequency, on multiple frequencies, and over a range of frequencies.

The one or more cameras 130 may capture still pictures and videos, in the visible light, infrared portions of the spectrum, and/or ultraviolet portions of the spectrum. The cameras 130 may be stereoscopic. The camera(s) 130 may be wide-angle, e.g., with over 90 degrees of coverage. In embodiments, the cameras 130 face different directions; their horizontal coverage may overlap, and may extend horizontally 360 degrees. In embodiments, the camera(s) 130 may be configured to determine distances from the TCD 100 to various objects, including distances to stationary objects such as vehicles; this may be done as is known in the art of photographic and video imaging and focusing. The cameras 130 may include foveated vision/imaging capabilities.

The visual traffic control display or displays 135 may include conventional red-yellow-green ("RYG") traffic lights and symbols facing one or multiple directions. The VTCD(s) 135 may include directional arrows in various colors (e.g., RYG), for controlling turning traffic, and various graphic and alphanumeric indicators, such as "STOP," "WALK," "DO NOT WALK," an image of a palm facing forward with splayed fingers, and digits such as for counting down time to change of states, in various colors, for pedestrians and/or drivers, which arrows and/or symbols may face one or multiple directions. The VTCD(s) 135 may be intended to control vehicular traffic, pedestrian traffic, and both vehicular and pedestrian traffic.

The interfaces 140 may include inputs for receiving signals from external devices that affect the state of the VTCD 100 as the state relates to immediate or future changes of the display signals produced by the VTCD(s) 135 under control of the processing module 105. (Or, more precisely, potentially affect the state of the TCD 100, depending on the state of the TCD 100 and the inputs from the external devices.) The inputs may read/sense the states of a number (one or more) of inductive loop traffic, detectors, for example, inductive loop traffic detectors buried under the roadway surface; pedestrian crossing pushbutton(s) and analogously-purposed devices such as devices designed to receive pedestrian traffic requests from smart phones and other mobile devices including devices built into wheelchairs, whether directly through short range RF and other transmissions, byway of a cellular service, and/or otherwise; inputs from traffic signal interruption device signals, for example, signals from emergency vehicle operator devices designed to interrupt regular operation of traffic control devices (including the TCD 100) and give priority to the emergency vehicles ("emergency preemption signals," which have already been mentioned); traffic sensing radar and/or other traffic sensing RF devices, whether active or passive; traffic sensing lidar and/or other traffic sensing active devices operating in the visible, infrared, and/or ultraviolet portions of the electromagnetic spectrum; traffic sensing sonar operating in the audible range, infrasound range, and ultrasound range of frequencies; passive optical traffic sensing devices, such as cameras with image processing capability (which capability may be provided by built-in processors, separate processors, and/or the processing module 105); passive audio/infrasound/ultrasound traffic sensing devices; and inputs from other devices that may affect the state of the TCD 100 immediately or in the near future, such as within 30 seconds, within 1 minute, within 2 minutes, within 3 minutes, within 4 minutes, and within 5 minutes. The nature of each interface 140 depends on its corresponding sensor. For example, an input may be simply a wire or a pair of wires that may convey information through the voltage on the wire or across the pair, or resistance between the wire inputs, or otherwise. The voltage may be controlled, e.g., by a pedestrian crossing pushbutton; by an inductive loop; by a self-contained sensor of the type mentioned above or another type; or otherwise. Additionally or instead, the interfaces 140 may provide for receiving (or exchanging) data that is not simply binary on-off. For example, a radar/lidar/photo appearance/signature or image may be received through one or more of the interfaces 140 for processing by the processing module 105 or otherwise; similarly, various digital signals may be received through the interfaces 140, such as Universal Serial Bus-compatible signals.

It should be noted that signals affecting the state of the TCD 100 may also far instead be received from other components of the TCD 100 including those described above. Thus, emergency preemption signals may be received, for example, through the RF receiver(s) 120A. Similarly, photo/video data may be received from the cameras) 130. Again, these are non-exclusive examples.

The bus(es) 145 may be of any design, including conventional serial and parallel bus designs for internal computer communications, Additionally, in the present context, "bus"/"buses"/"buss"/"busses" also designate direct connections between and among devices (components of the TCD 100) to allow unidirectional or multi directional (two or more) flow of information and control and other signals between and/or among the devices. These connections may be, for example, electrically wired, optical, or wireless.

The operation of the VTCD(s) 135 may be controlled by a state machine for example a state machine implemented by code executed by the processing module 105. A person skilled in the art would understand after careful perusal of this document and the incorporated patent documents that the states (and their corresponding displays on the VTCD(s) 135) and state transitions may be affected by the signals/information received through the interfaces 140, the RF receivers 120A, the camera(s) 130, internal timer(s)/clock(s), and possibly other internal/external devices.

As has already been discussed in the context of defining FGRs, the sources of the state-affecting signals may malfunction or otherwise send corrupted signals (or fail to send correct signals) to the processor module 105, for example, through the interfaces 140. For example, a pushbutton of a pedestrian crossing may be stuck in the pushed-in or out position; an inductive loop may constantly produce a signal corresponding to a vehicle awaiting a light change, regardless of the presence of such vehicles: signal corruption in this sense may also result from a vehicle that is on top or near (within sensing distance of) the inductive loop, perhaps, for example, because the vehicle broke down, is illegally parked, or is an emergency/maintenance vehicle stopped in a traffic lane. The corrupted signals received by the processing module 105 can cause the state machine to operate so that the flow of traffic at the intersection is deleteriously affected. For example, the TCD 100 may lengthen green light in one direction in response to the corrupt signal erroneously indicating that there are cars still flowing in this direction; the traffic (vehicular/pedestrian/both) flow in one or more conflicting directions may then be deleteriously affected.

In embodiments, the processing module 105 of the TCD 100 executes code to detect corruption of the state-affecting signals/information received through the interfaces 140 or otherwise. Upon detection of the corruption of the state-affecting signals/information, the processing module 105 may execute code to adjust the operation of the TCD 100 to reduce or eliminate (mitigate) the deleterious effect of the corruption; the processing module may also or instead execute code to report a malfunction, for example, report the malfunction to a proper authority, or for additional processing/verification/evaluation at one or more remote facilities. The additional processing/verification/evaluation may include the use of human resources, including crowdsourced resources and persons outside of the jurisdiction (state, country) where the TCD 100 is located. In embodiments, the processing module 105 and one or more processors execute code to diagnose the corruption of the state-affecting signals/information and/or other malfunctions involving the operation of the TCD 100, and to mitigate and/or correct the malfunctions.

There are several ways to detect FGRs and UTGRs. In examples, the process of detecting FGRs and UTGRs may be broken into two parts: (1) preliminary detection, and (2) verification (confirmation/disconfirmation). Preliminary detection may be performed by comparing recent state changes (including the absence of state changes) of a given green request signal. For example, if a particular GR has been continuously signaling for over a predetermined period of time, a preliminary detection of an FGR may be made. Similarly, if a particular GR has not been detected for a predetermined period, a preliminary detection of a UTGR may be made. The lengths of the predetermined periods (for FGR and/or UTGR preliminary detection) may vary as function(s) of various variables, including time of the day, day of the week, and calendar date. In particular, the following day/date and time attributes ("calendar attributes" and "time attribute") may affect the lengths of the predetermined periods: whether it is a work/business day, a weekend day, a school day, a holiday (federal, state, religious), significant traffic-affecting event day in general or within a predetermined distance (e.g., a local fair or farmers' market, a parade, a presidential/dignitary visit) within a predetermined distance of such as 1.6/3.2/4.8 kms or one two/three miles) of the TCD, day time, night time, rush hours or business hours (such as 9 am-6 pm). The length of the predetermined period may be initially set to some default value and then varied based on the statistics of actual traffic and GRs detected at the TCD or at other TCDs in a larger area such as within a predetermined distance (e.g., within one, three, five, ten miles) of the TCD or in the same zip code as the TCD. Additionally, a preliminary detection of an FGR may be made when the particular GR is not continuously signaling but nevertheless is signaling for a percentage of time that is much greater (e.g., more by a factor of $\geq 2$, $\geq 3$, $\geq 10$) than would be statistically expected based on the other factors (e.g., day/date/time etc., as has already been described in this paragraph). Multifactor, regression, principal component analysis, and other statistical techniques may be employed to determine the influence of the different factors on the expected length of time to GR signal transition and deviations from the expected length of time. Bayesian statistics may be employed in calculating the expected values, conditioned by the other factors. Neural, networks including deep learning, and other artificial intelligence ("AI," which term here and throughout this document includes statistical prediction machine learning, neural networks, deep learning, reinforcement learning, factor analyses) systems, may also be employed, based on the experience of the same and/or other TCDs and their malfunction reporting; the other TCDs may be in similar locations (from, e.g., traffic flow, population density, zoning, and/or other perspectives). The variables/parameters input into the AI algorithms for learning may include population density near the TCDs, traffic flow in the vicinity of TCDs, distance from the TCDs to known/visible security cameras, distance from the TCDs to law enforcement bases (police/sheriff stations), and others.

The verification step may be performed in several ways, some or all which may be combined. This is the case with all features described throughout this document and the incorporated documents, which features may be present individually, in any combination, and in any permutation, unless the presence or absence of specific features is inherently required, explicitly indicated, or otherwise made clear from the description.

Figure 2:
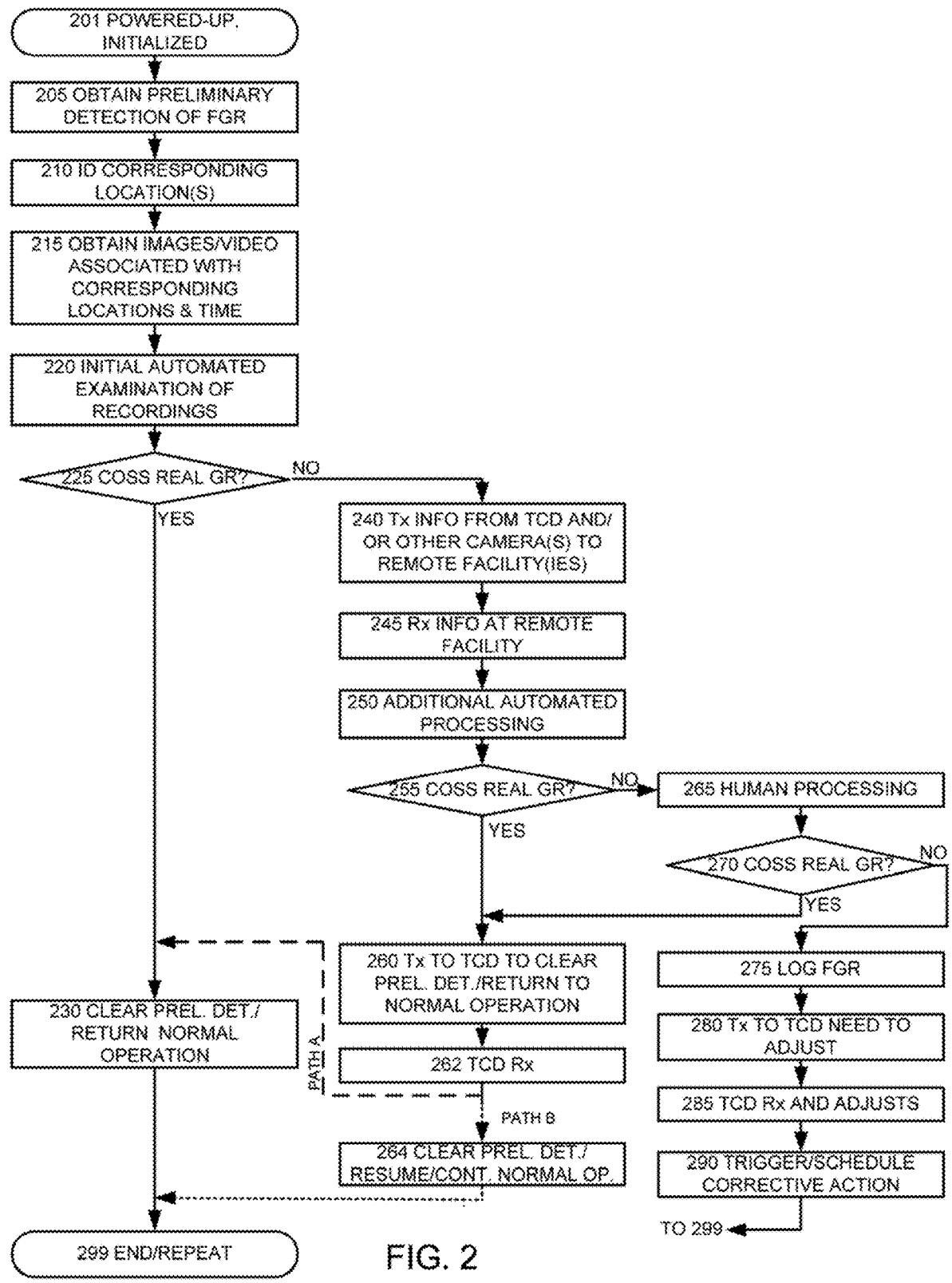
FIG. 2 illustrates selected steps/decision blocks of a process for identifying faults in traffic control devices and/or in sensors connected to the traffic control devices.

FIG. 2 illustrates steps of a process 200 for obtaining a preliminary detection of an FGR, and verifying it. At flow point 201, the TCD 100 and other devices (if applicable) is (or are, as the case may be) powered-up, initialized, and ready to perform the steps of the process 200.

In step 205, a preliminary detection of an FGR is obtained. The preliminary detection may be generated by the TCD 100, received by the TCD 100 from elsewhere, received by a remote processing, device (or devices) such as a remote server/remote facility and sent to the TCD 100, and/or generated by the remote device(s) (based on the information provided by the TCD 100 and/or other sources) and sent to the TCD. Some examples of preliminary FGR detections have already been described, including continuous or excessively prolonged or excessively frequent GR(s).

In step 210, the physical locations corresponding to the preliminary FGR detection are identified. Physical locations that correspond to the preliminary FGR detection are such locations from which a true GR associated with the FGR can be generated. If the GR relates to a pedestrian crossing pushbutton, for example, the physical locations are locations where persons who pressed the pushbutton would have been located (e.g., within an arm's reach or less than 1, 2, 3, 4, or 5 meters of the pushbutton) at the time the pushbutton was pressed or within some short period (e.g., less than 1, 2, or 3 seconds) of the time the pushbutton was pressed. If the GR relates to an inductive loop sensor, for example, the physical locations are locations where a vehicle that could have activated the inductive loop sensor would have been located at the time the of the preliminary detection or within some short period (less than 1, 2, 3, 4, or 5 seconds) of that time (which may translate into a distance of e.g., less than 3, 5, or 10 meters of the vehicle from the sensory range of the inductive loop). All such locations can be identified, for example, from a pre-stored mapping of the TCD's sensors (pushbuttons, inductive loops, etc.) to their corresponding locations. If the GR relates to multiple inputs/sensors (e.g., pedestrian pushbuttons on opposite sides of a roadway that produce inputs which the TCD cannot distinguish, different inductive loops on the same input, which the TCD cannot distinguish), then all such locations for each of the inputs/sensors may be identified. The processor may retrieve from the pre-stored mapping the identification of the locations corresponding to the preliminary FGR detection.

Still and/or video image recordings of these locations at the time (and possibly slightly before and/or after the time) the GR that resulted in the preliminary detection of the FGR was generated are obtained, in step 215, so that they can be examined. The images may be taken by the camera(s) 130 and/or nearby camera(s) outside of the TCD 100.

For example, the TCD 100 identifies such locations based on the placement/position of the camera(s) 130 and/or the nearby camera(s) and the directions in which they face (the cameras' orientations), and the relevant time period(s) when the FGR was detected; as another example, the TCD 100 requests the recordings from one or more of the nearby cameras, specifying in the request(s) the time of the FGR and the corresponding physical location(s). The nearby cameras are not necessarily part of the TCD 100, but nevertheless may be available to (accessible by) the TCD 100; they may be stationary or mobile. The nearby cameras may be installed in mobile devices of vehicle occupants or pedestrians in the vicinity of the TCD; they may also be installed in the vehicles in the vicinity of the TCD 100 at the time of the FGR. Additionally, sound recordings, lidar output recordings, and radar (and more generally, active/passive RF devices, light/ultraviolet/infrared devices) recordings corresponding to the same timeframe may be obtained in this step. The camera(s) 130 and/or the nearby cameras may use foveated vision/imaging capabilities to obtain the images of the particular locations.

In step 220, the still and/or video and/or other recordings corresponding to the time the GR was generated (e.g., within 50 millisecond, 100 milliseconds, 500 milliseconds, 1 second of the time the GR was first generated or continued to be generated) are initially examined automatically (i.e., machine- or computer-examined), to determine whether an appropriate entity (e.g., a person in the case of a pushbutton GR, a vehicle in the case of an inductive loop sensor) was present in the location(s) at the time of activation/detection. The presence of a person near (e.g., within an aim's reach of, within three feet/0.91 meters of within four feet/1.22 meters of) the pushbutton or touching the pushbutton at the time would strongly suggest that the person pressed the pushbutton and the GR was not a false one; and a vehicle in the immediate proximity of the inductive loop sensor (e.g., within the known maximum or typical sensory range of the inductive loop) would strongly suggest or even conclusively establish that the GR was not a false GR. The automatic examination may include attempting to recognize a vehicle (even a small one, such as a bicycle or a moped) or another large object in the locations by the visual/IR/UV appearance/signature of the vehicle/object, by its radar/lidar appearance/signature, appearance/signature of another type of RF reflections or emissions, and/or by its sound signature. The TCD 100 may store (e.g., in the storage 110) a variety of signatures (visual/IR/UV signatures, radar/lidar signatures, other types of RF reflection signatures, sound signatures) and their correspondence or probability of correspondence to actual objects/vehicles/persons. The automatic examination may include comparing the current signature (of whatever kind) to the stored signatures, and determining that a person for a vehicle) was present in the location(s) based on the match (beyond a predetermined probabilistic level). Artificial Intelligence algorithms may be employed for this purpose and, as will be seen, the AI algorithms may be improved/trained based on the processing in the remote facilities, which processing may be machine-processing and/or human processing, which may be crowdsourced.

If the result of the automatic examination in the step 220 is conclusive or suggesting strongly ("COSS") that the GR was a real one and not an FGR, as determined in decision block 225 based on the automatic examination in the step 220, process flow continues toward step 230. The step 230 clears the preliminary detection, continuing/resuming normal operation (operation as before the preliminary detection of the FCR) of the state machine of the TCD 100. Supplemental processing may also be performed, as well as storage of the information (sensor readings, video/still/other recordings) that resulted in or is associated with (e.g., same timeframe) the preliminary detection in the step 205. The process 200 may then end at flow point 299. The process 200 may be repeated as needed or desired, for example, in response to another preliminary FCR detection in the step 205.

A result is a COSS GR result when the step 220 indicates with sufficient certainty (such as a probability greater or no less than a predetermined threshold) that the GR was real; the predetermined threshold may be between 50% and 100%, for example, but other threshold values may also be used. When the step 220 is designed to indicate either of two possibilities (1) a GR, or (2) not a GR, only the first indication (GR) is a COSS GR result. When the step 220 is designed to indicate one of three or more possibilities (1) GR, (2) uncertain (there may be a number of possibilities here, with different probability ranges), and (3) not GR, then only the first possibility (GR) may be considered a COSS GR result in some embodiments; in other embodiments, the "uncertain" possibility is, or some of the "uncertain" possibilities are, also considered COSS GR. When the step 220 is designed to produce a range of possibilities between a certain GR and a certain not GR, then a COSS GR result applies only to all the possibilities indicating GR with the probability at or above the predetermined level, such as the predetermined threshold of 50%-100% probability, and above. In embodiments, recognition of a person in the relevant location and relevant timeframe is considered a COSS pedestrian pushbutton GR; and recognition of a large object (the size of a vehicle, possibly even a relatively-small one such as a bicycle/moped, and/or an object with a sufficiently strong electromagnetic and/or optical signature) within the maximum or typical sensory range of an inductive loop is considered as COSS is loop (or other vehicle sensor) JR.

If the result of the automatic examination of the step 220 is not conclusive/strongly suggestive that the GR was real (not a "COSS GR" as determined in the decision block 225), process flow continues toward step 240, to transmit the information regarding the events that caused generation of the preliminary detection of the FGR from the TCD 100 to one or more remote processing facilities, e.g., the remote computer/server (or computers/servers, as the case may be here and throughout this document). If the TCD 100 itself generated or received the preliminary detection of the FUR from elsewhere, the TCD 100 may transmit to the remote facility the information that caused the generation by the TCD 100 of the preliminary detection (such as information received through the interfaces 140, video/still/other recordings received from the camera(s) 130 or the external camera(s), information received from another device, and identification of the corresponding locations and times). The information transmitted to a remote facility may include the number of times the sensor signals received by the TCD 100 through the interfaces 140 transitioned and the direction of the transitions, and/or images/videos generated by the still and/or video camera(s) 130 and/or the nearby camera(s), during the times near and preferably surrounding the time the preliminary indication was generated. The TCD 100 may also or instead transmit radar and/or lidar and/or sound and/or other RF signal-based recordings of the objects detected near the vehicle sensor(s) and/or pedestrian sensor(s). The TCD 100 may thus have the appropriate devices and capability to make such recordings, for example, including microphone(s) to capture sound, receivers and/or illuminators in the visual/IRAN and RF portions of the spectrum, and other devices. The TCD 100 may transmit the information to the remote facility using the transmitters 120B, or other communication interface(s) of the TCD 100. For example, the TCD 100 may have wiring (e.g., wire lines, optical connections), connecting it to a network and/or to one of the remote facilities.

While waiting for a decision regarding the preliminary detection of the FGR (whether it resulted from a real GR or a fault) from the remote facility, the TCD 100 may adjust the operation of the state machine, in effect presuming for the time being that the preliminary FGR detection resulted from a fault. This step is not, illustrated FIG. 2, but, generally, may follow the NO determination in the decision block 225. For example, the TCD 100 may stop using (disregard) the particular faulty input (such as the input from the sensor responsible for the preliminary detection of the FGR) in operating the state machine, and switch to default (e.g., timed) transitions of the state machine, in part or in whole.

In embodiments, the TCD 100 records and stores the video continuously and/or still images continually (periodically and frequently), as well as the states of the sensors connected through the interfaces 140 and the radar/lidar output data. The recording may be on a looped basis, for example, a loop of 1-10 seconds, less than 30 seconds, less than 1 minute, less than 5 minutes, less than 10 minutes, or another duration; and when some earlier time information is needed (e.g., to analyze in the step 220 and/or to send to the remote facility in the step 240), the overwriting of the looped recording may be stopped and the recording for the relevant period may be retrieved and analyzed/sent. The following patent documents describe somewhat similar schemes for looped recording: Yoshizaki et al., U.S. Pat. No. 8,870,365 ("Yoshizaki"); Fiedler, U.S. Pat. No. 6,804,638 ("Fiedler"); and Weiser, U.S Pat. Appl, Publication No. 2005/0096764 ("Weiser"). The disclosures of Yoshizaki, Fiedler, and Weiser are incorporated herein by reference in their entireties. In sum, the recorded information (sensor states, visible/IR/DV video, visible/IR/IN still images, radar/lidar output data, other relevant and available information) is retrieved for a period that may begin before the preliminary indication of an FGR is generated or received, and before the time that the event that resulted in the preliminary indication of the FGR occurred or was sensed/detected; and may extend until after the preliminary indication of an FGR is generated or received, and after the time that the event that resulted in the preliminary indication of the FGR occurred or was sensed/detected. The total duration of the retrieved and analyzed/sent recording may be preset and may be sufficiently long to determine with high likelihood of accuracy whether the GR was real or false, in typical circumstances; for example, the duration may be between 1 and 10 seconds, though shorter durations may suffice and longer durations may be useful.

In embodiments, a camera-equipped nearby device records and stores the visible/IR/UV video continuously and/or visible/IR/UV still images continually at predetermined intervals (for example, every one-half second, every second, every two seconds), and provides/transmits the recorded information in the same or analogous manner, in the step 240, to the remote facility, directly, through the TCD 100, and/or through other devices. The recording(s) from the nearby device(s) may be opportunistic and obtained by the TCD 100 and/or the remote facility by interrogating the other device(s) with the external camera(s).

The nearby devices) may also employ "looped" recording technique explained above.

Once the information from the step 240 is received at the remote facility, in step 245, it may be processed more extensively there, using additional and/or other resources, in step 250. These additional/other resources may include computational resources, data base resources, and algorithmic resources ("automated resources"). For example, at the remote facility (1) additional information regarding traffic flows may be available (such as from additional cameras, stationary or in-vehicle and other mobile cameras), and/or (2) more extensive computational resources may be available for improved processing (relative to the processing in the step 220), and/or (3) better or different artificial intelligence algorithms may be available. (Here as in the step 220, AI algorithms may be employed and, as will be seen, the AI algorithms may be improved based on the processing in the remote facilities, particularly human processing which may be crowdsourced.) The result of the step 250 may also be (1) conclusive or strongly suggesting that the GR was a real one and not an FGR, or (2) other; this is determined in decision block 255.

If the result of the automatic examination of the step 250 is conclusive or strongly suggestive of a real GR (e.g., showing that a person was next to or within a predetermined distance of the pushbutton, or a vehicle was in immediate proximity of the inductive loop sensor, such as within the inductive loop's maximum or typical sensing distance), as determined in decision block 255, a transmission from the remote facility to the TCD 100 may be made, in step 260, to request the TCD to clear the preliminary detection of the FGR and resume normal state machine operation (operation as before the preliminary FGR was obtained).

The determination performed in the decision block 255 may be similar to, analogous to, or same as the determination performed in the decision block 225, though the input into the decision block 255 may include data other than the data input into the decision block 225.

The transmission of the step 260 is received at the TO 100, in step 262. In response to the receipt of the transmission, the TOE) clears the preliminary detection of the FGR, continuing/resuming the normal operation of its state machine. This may be performed (Path) in the step 230 discussed above. In variants, however, it is performed somewhat differently (Path B) in step 264; for example, it is perforated without the supplemental processing such as was described in relation to the step 230; there may be other differences between the steps 230 and 264. The process max then terminate at the flow point 299, and may be repeated as needed or desired.

If, however, the result is not conclusive or strongly suggestive of a real GR, as determined in the decision block 255 (based, e.g., on the processing of the step 250), the remote facility may engage one or more human resources, in step 265, to make a more conclusive determination regarding the need to clear the preliminary FGR detection, so that the TCD 100 may continue operating normally, and regarding the need to take corrective action and adjust the operation of the TCD 100. For example, the relevant information (such as the visible/IR/UV still images, visible/IR/UV video, log of events received through the interfaces 140) may be sent to one or more human analyzers specially trained to make an appropriate determination based on such information, and/or to untrained human analyzer(s).

In embodiments, the human resources is/are or include crowdsourced or crowdsourcing resource(s). The Amazon Mechanical Turk is an example of a crowdsourcing Internet-based resource that enables the use of human intelligence for tasks that computers do not yet perform well. Requesters post tasks that providers can perform for compensation. Thus, in the step 265, a crowdsourced human resource may be engaged, for example, automatically assigning the determination to a predetermined number (one or more) of pre-qualified providers, and measuring their consensus. A consensus above a predetermined percentage is assumed to be conclusive (in the context of the process 200) as to the GR being real or false. The predetermined percentage may vary based on the number of providers. Note, however, that a single provider may be used, and the single provider's determination may be conclusive (in the context of the process 200).

The human analyzer (which may include several humans and a computer system aggregating their responses may then provide an answer to decision block 270. If the human analyzer considers that the GR event was real (not an FGR), process flow continues towards the steps 260/262 and then to the step 230 or 264, to transmit to the TCD 100, causing the TCD 100 to clear the preliminary indication so that the TCD 100 may continue or resume normal operation. The process then terminates at the flow point 299, and may be repeated as needed or desired.

If the human analyzer decides that the event is (or is likely) an FGR, process flow continues from the decision block 270 to step 275, to log (record) the FGR and the related information, such as the sensor inputs, video/still/sound/lidar/RF recordings, and the relevant times and locations. This may also be performed at the remote facility.

In step 280, a transmission is made from the remote facility to the TCD 100 to notify the TCD 100 that an appropriate adjustment to the operation of the state Machine of the TCD 100 should be made. For example, the TCD 100 may, in response to this "adjust" notification, stop relying on a particular faulty input, and switch to default (e.g., timed) transitions of the state machine, in part or in whole. In embodiments, the needed adjustment may already have been made by the TCD (the TCD in effect presumed for the time being that the preliminary FGR detection resulted from a fault), so the effect of the notification may be for the TCD to continue operating, in the same adjusted manner.

In step 285, the TCD 100 receives the "adjust" notification, and performs the appropriate adjustment(s), or continues to operate as previously adjusted. The notification may indicate the specific adjustment(s) needed, or notify the TCD 100 of the specific fault, or simply confirm the FGR corresponding to the preliminary detection obtained in the step 205. In embodiments, the "adjust" notification includes an identifier of the transmission of the steps 240/245, or an identifier of the preliminary detection of the step 205, or other data from which the TCD 100 is able to determine the particular preliminary detection. If the remote facility does not instruct the TCD 100 what adjustments are to be made, the TCD 100 may determine the adjustment(s) that is/are needed, and perform the adjustment(s), such as switching to a timed operation so that the traffic flow in the direction corresponding to the malfunctioning sensor is periodically allowed for a predetermined time duration and periodically disallowed so that traffic may flow in conflicting direction(s). The TCD 100 may store a table relating different events that cause the preliminary detections obtained in the step 205 to specific adjustments, and make the adjustments according to the table.

In step 290, an appropriate corrective action may be triggered or scheduled, such as signaling to schedule a visit by maintenance/repair personnel, signaling to schedule a towing operation, etc. This may be performed, for example, by the remote facility; as another example, this step may be performed by the TCD 100 in response to receiving the notification in the step 285, perhaps by transmitting a request to the appropriate authority.

The process may then terminate at the flow point 299, and be repeated as need or desired.

As a person skilled in the art would understand after careful perusal of this document including the attached drawings and of the incorporated documents, certain analyses and decisions regarding the preliminary detection and/or the verifications can be performed completely at the TCD 100, at a remote facility, with combined resources of both the TCD 100 and the remote facility, or at different times at both the TCD 100 and the remote facility.

The processing/decisions made by the human analyzer(s) in the step 265 may be stored together with their corresponding still/video/lidar/RF/sound/other recordings and corresponding sensor data (such as the data from the state-affecting sensors), and subsequently used to train artificial intelligence to distinguish better between false and true GRs. In this way, the steps 220 and 250 may continue to be improved, to distinguish better between true and false GRs. Additionally, the information selected for transmission in the step 240 and corresponding receipt in the step 245 may also be refined through addition of information relevant to the making of "COSS REAL GR" decisions and/or deletion or non-transmission of information that is not relevant to or useful for making of the decisions.

Figure 3:
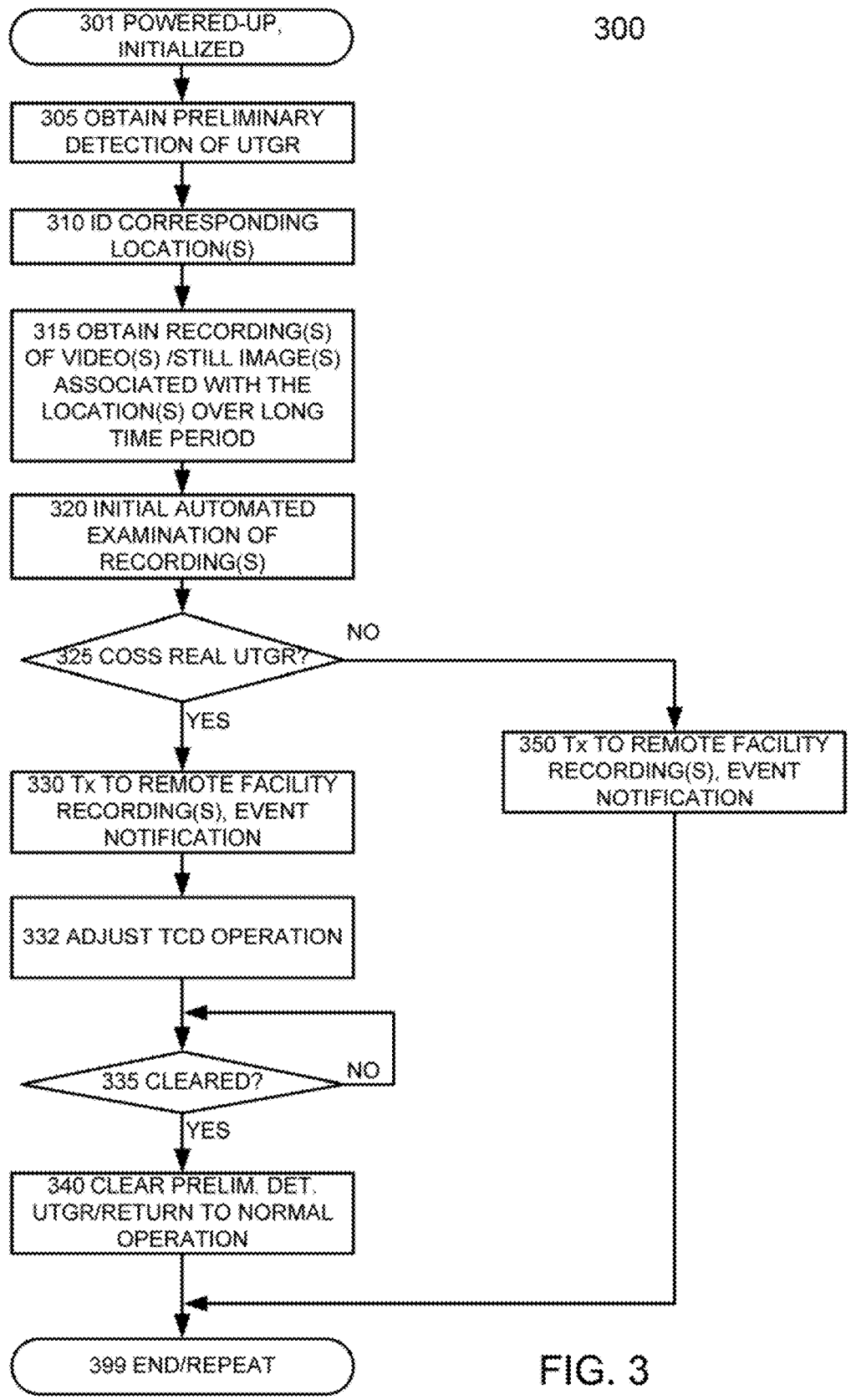
FIG. 3 illustrates selected steps/decision blocks of another process for identifying faults in traffic control devices and/or in sensors connected to the traffic control devices.

FIG. 3 illustrates selected steps and decision blocks of a process 300 for obtaining and processing/verifying a preliminary detection of a UTGR. At flow point 301, the TCD 100 and other devices (if applicable) is (or are, as the case may be) powered-up, initialized, and ready to perform the steps of the process 300.

In step 305, a preliminary detection of a UTGR is obtained. The preliminary detection may be generated, for example, by the TCD 100 in response to the TCD not detecting a change in state of a particular state-affecting sensor (pedestrian pushbutton, inductive loop) for an excessively long period of time. As another example, the preliminary detection may be generated in response to analyzing image(s) of a VTCD of the TCD 100 and detecting when the VTCD does not change to allow traffic (pedestrian, vehicular, both) to proceed in the direction controlled by the VTCD for an extended period of time. The preliminary detection may be received by the TCD 100 from another source such as a remote computer system, an RSU, a street light camera another TCD nearby a beacon nearby, and other sources. The preliminary detection may also originate from a person submitting a report to the remote computer system or directly to the TCD 100.

In step 310, the physical locations corresponding to the preliminary detection are identified. Physical locations that correspond to the preliminary detection are such locations from which a true GR associated with the UTGR may be generated. In embodiments, this step may be identical, similar, or analogous to the corresponding step 210 of the process 200.

Video recordings) and/or still image(s) recordings of these locations during a long predetermined time period are then obtained (or have been previously obtained), in step 315, so that they can be examined. For example, the TCD 100 identifies such recordings based on the camera(s) 130 locations and directions in which they face (the cameras' orientations), as another example, the TCD 100 requests the recordings from one or more nearby cameras, basing the request on the relevant time (the time period when no GRs were received) and the identified physical locations from the step 310. In embodiments, is >2 minutes. In embodiments, the length of the long predetermined time period is based on the experience/statistics of the TCD 100. For example, if the TCD 100 experience is such that a particular sensor has always or almost always (at or above some relatively-high predetermined percentage of times, such as between 50% and 90%) provided at least one GR within a period T, then the longest predetermined period may be set to T times a predetermined parameter, for example, between 2 and 10. The period T and/or the predetermined parameter and/or the predetermined percentage of times may be varied depending on a number of factors, such as calendar and time attributes etc. (as has already been discussed).

In step 320, the video/still image(s)/recording(s) are initially examined automatically, to determine whether an appropriate entity (e.g., a vehicle in case of an inductive loop sensor or another vehicle sensor, a pedestrian in case of a pedestrian pushbutton or another pedestrian sensor) was present in the locations during the recorded period. A vehicle in the immediate proximity (e.g., maximum or typical sensing range) of the inductive loop sensor should have produced a GR, which CIR was not detected/received. The automatic examination may include attempting to recognize a vehicle (even a small one, such as a bicycle) or another large object in the locations, by the visual/IR/UV appearance attire of the vehicle object, by its radar/lidar appearance signature, appearance/signature of another type of RF reflections, by its sound, and/or through other means. The step 320 may be identical, similar, or analogous to the step 220 of the process 200.

If the result of the automatic examination in the step 320 is conclusive or suggesting strongly that the UTGR is a real one, as determined in decision block 325 based on the examination of the step 320, process flow continues towards step 330. The result may be a COSS real UTGR if, for example, a vehicle or another large object is identified in the automatically-examined recordings, within the maximum or typical sensing range of the inductive loop; and/or if a person waiting, over some predetermined period (such as one minute) is identified in the automatically-examined image(s)/recording(s), within an arm's length (such as less than some predetermined distance between one and four feet or 0.3-1.22 meters) of the pushbutton.

A result way be a COSS real UTGR result when the step 320 indicates with sufficient certainty (such as a probability greater than or not less than a predetermined threshold (e.g., between 50% and 100% or a probability greater than another predetermined threshold) that the UTGR was real, i.e., that a GR should have been sensed but was not. When the step 320 is designed to indicate either (1) a UTGR (a GR should have been sensed but was not sensed), or (2) not UTGR. (no GR should have been received and was not received), the former indication (UTGR) is a "COSS real UTGR result," the latter indication is a result of "not UTGR." When the step 320 is designed to indicate one of three possibilities (1) UTGR, (2) uncertain, and (3) not UTGR (no GR), then only the first possibility (UTGR) is a COSS real UTGR result in some embodiments. When the result of the step 320 is designed to produce a range of possibilities between and including both a certain UTGR and a certain not UTGR, then a COSS real UTGR result applies to all the possibilities indicating UTGR at or above a predetermined probability level, such as 50%-100% tor above another predetermined threshold) that a GR should have been sensed but was not sensed.

In the step 330, the video/still image(s)/recording(s) are transmitted to the remote facility together with a notification of the event (or events, when multiple vehicles/persons in the locations were identified in the image(s)/recording(s)).

In step 332, the TCD 100 adjusts its operation (the operation of its state machine) to account for (mitigate) the bad sensor input; for example, the TCD 100 may switch to a timed operation, so that the traffic (whether vehicular or pedestrian) flow in the direction(s) corresponding to the malfunctioning sensor is periodically allowed, despite not sensing a GR. Such operation may be programmed in the state machine even when the sensor is not malfunctioning; in this case, the time period may be shortened in response to the UTGR being real.

Process now may then advance towards decision block 335, in which the TCD 100 determines whether the malfunction has been cleared (while operating as adjusted in the step 332, if the adjustment was made). Clearance of the malfunction may be determined by receiving a notification from a remote facility to the effect that operation should return to normal (operation before the adjustment of the step 332), for example, because it was determined at the remote facility based on the information from the step 330 that there was no malfunction, or when the TCD 100 senses that the sensor input (that initially caused the preliminary detection of the UTGR in the step 305) begins switching states with sufficient frequency at a later time. ("Sufficient frequency" here may be, in examples, such that would not have resulted in the preliminary UTGR detection in step 305.) If the malfunction has been cleared, the TCD 100 clears the preliminary detection of the UTGR in step 340, and returns to the normal operation as before the adjustment in the step 332. The process may terminate at flow point 399, to be repeated as needed or desired, for example, when triggered by another preliminary UTGR obtained/received/detected in the step 305.

Returning to the decision block 325, if the result of the automatic examination in the step 320 is negative, process flow continues towards step 350, where the TCD 100 transmits to the remote facility the recordings and a notification that a UTGR was suspected but found not to exist. The remote facility may examine the recordings automatically and/or manually (engaging a human resource, which can be a crowdsourced resource) and come to the same or a different conclusion, may send a transmission to the TCD 100 that it should lengthen the predetermined period for recording in the process 300 (the steps 305 and/or 315) or that the UTGR was in fact present, or simply monitor the notifications from the step 350 and take some action later, perhaps in response to an increased frequency (greater than a predetermined frequency) of such notifications. In embodiments, the process flow bypasses the step 350.

The process then terminates at the flow point 399, and can be repeated as needed or desired.

Figure 6:
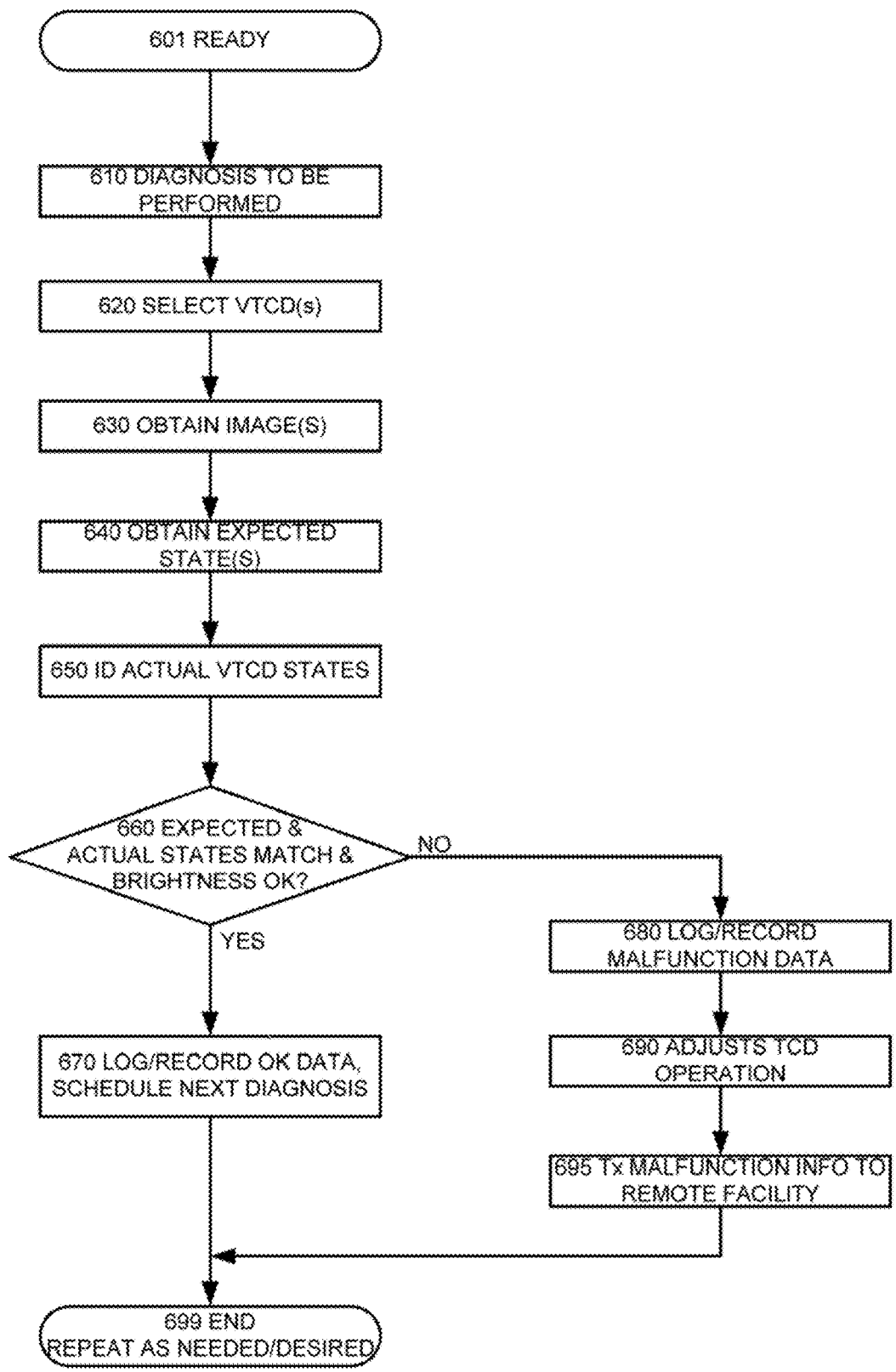
FIG. 6 illustrates selected steps/decision block of a process for identifying display-related faults in traffic control devices.

Another type of TCD malfunction is failure of one or more of its VTCDs. A given VTCD may fail to display the required signal. For example, the VTCD might not display (when it should display) a red/yellow/green light, an icon such as a forward-facing palm with splayed fingers, a message, an arrow. The failure may be complete or partial. For example, a VTCD may fail to display anything, may have one or more segments that are always on or always off, or may be too dim (light emission below the applicable light output specification). The reasons for such failures may lie in the light emitting elements (whether LED, incandescent, florescent, or other elements); in drive circuitry of the elements, in the circuitry that controls the operation of the elements; or elsewhere. Whatever the underlying reason, the expression "display failure" may be used to indicate the failure to display properly what should be displayed in accordance with the state of the TCD and its state machine, FIG. 6 illustrates steps of a process 600 for diagnosing TCD display-related failures.

At flow point 601, the TCD (e.g., the TCD 100) is powered-up and initialized.

In step 610, it is determined that diagnosing of the TCD should be performed. For example, the TCD may be programmed to perform self-diagnosis periodically, at random and/or predetermined times, in response to detection of some pattern or irregularity in traffic flow, in response to some internal event such as detection of some pattern or irregularity in power flow (current flow) into one or more VTCDs and/or one or more portions thereof, a signal ("diagnosing trigger signal" or "DTS") instructing (commanding/requesting) the TCD to perform the diagnosing process, and/or in response to another type of event/occurrence/stimulus.

In step 620, the VTCD to be diagnosed is determined/selected. For example, the particular VTCD to be diagnosed may be selected in a round robin fashion, in some predetermined or variable order, randomly, or otherwise. As another example, the TCD may be configured to monitor traffic flow through the intersection controlled by the TCD, and the particular VICE) may be selected based on the specific pattern/regularity of traffic flow, such as an excessive slowing and/or stopping of the traffic flow in a particular direction at the intersection controlled by the TCD. The particular direction may be the direction controlled by the VTCD or a conflicting direction. The excessive slowing may be indicated by a statistical deviation from the expected value of through traffic volume greater than a predetermined threshold, such as a multiple (e.g., 0.8, 1, 1.5, 2) standard deviations; each of the expected value, the standard deviation, and the multiple may be varied based on the time, calendar, and local event attributes of the TCD's location. As still another example, the particular VTCD may be selected based on the specific internal event of the step 610, such as the detection of the pattern/irregularity in the current flow to the selected VTCD or its element(s) or another VTCD/elements. As still another example, the particular VTCD may be selected based on the vantage point a the image(s) received (as is discussed below). Furthermore, the particular VTCD to be tested may be given e.g., identified, requested, suggested, pointed to) by the WES or derived from information received together with the DES (whether or not from the same source as the DTS) or otherwise obtained. In examples, the DTS may be generated by a person; in other examples, it is generated by an apparatus, such as a computer-based system. This step (VTCD selection) may be performed, for example, by the TCD, by another TCD, by a remote facility, by another traffic-related device/system, by a person, by a combination of such items (devices/persons).

In step 630, the image(s) of the selected VTCD during a diagnostic period of time are obtained. For example, the TCD or different apparatus may transmit a request to an external camera-equipped device having a view of the VTCD, to record and/or transmit the images. The external camera-equipped device includes an external camera. It may be a camera of an RSU or a beacon, a camera of another TCD in the area, a camera installed in a vehicle passing, through or near (e.g., in the vicinity of) the intersection controlled by the TCD, a camera in a mobile device of a pedestrian nearby (e.g., in the vicinity of the intersection/TCD), a camera in a mobile device of a person in a vehicle passing through or near (e.g., in the vicinity of) the intersection, a stand-alone camera with communication capability such as a street light camera. Note that multiple external camera-equipped devices and multiple external cameras may participate in the process 600 as well as the processes described in this document.

The external camera-equipped device records the images and transmits them to the TCD, directly or indirectly. Alternatively, the external camera-equipped device transmits the images in real time, as they are captured, without recording them. The TCD receives the images sent in response to the request. The images may be time-stamped.

In step 640, the expected states of the VTCD being diagnosed/tested are recorded during the diagnostic period or part of the diagnostic period. For example, the states of the VTCD as determined by the state machine of the TCD are recorded. The recorded states may be time-stamped. The step 640 may be performed in parallel with obtaining the images in the step 630.

The diagnostic period or the part of the diagnostic period may be selected so that the expected state of the VTCD changes one or more times during the diagnostic period or part of the diagnostic period.

In step 650, the images are parsed to identify the area (or areas) showing the display of the CD, and recognize the actual states of the VTCD. The times corresponding to the actual states are recorded together with the actual states.

In decision block 660, the expected states of the VTCD (from the step 640) are compared to the contemporaneous actual states of the VTCD (from the step 650). Additionally or instead, the brightness of the VTCD may be evaluated (measured against a predetermined brightness threshold) to determine whether or not the brightness meets the requirement applicable to the VTCD.

As a person skilled in the art would recognize after careful perusal of this document with the appended figures, a and the related applications, the contemporaneous expected and actual VTCD states should match when the VTCD is functioning properly, if the expected states and the contemporaneous states in the images indeed match, and the brightness (if brightness is evaluated) meets the applicable requirement, the process flow proceeds towards step 670, to log (record/store) the outcome of no malfunction detected, the particular VTCD from among the VTCDs of the TCD), diagnosed, and the time/date the VTCD diagnosis was performed. The time and/or date of the next diagnosis of the VTCD may be scheduled as well. The process 600 may terminate at flow point 699, to be repeated as needed or desired.

Otherwise, the process flow proceeds towards step 680, to log the outcome mile of malfunction(s) detected, the particular VTCD affected, the type of malfunction(s), the data relating to the malfunction(s) (which may include the image(s) and the corresponding expected states), and the time/date the diagnosis was performed and the malfunction(s) detected.

In step 690, the TCD adjusts its operation to mitigate problem(s) caused by the malfunction(s). For example, in response to a failure of a VTCD to turn green when needed, the TCD may change the state machine so that the green state of that malfunctioning VTCD is replaced by a flashing red light, a flashing yellow light, a solid yellow light; similarly, in response to a failure of a VTCD to turn red when needed, the TCD may change the state machine so that the solid red state of that malfunctioning VTCD is replaced by a flashing red light, a flashing yellow light, a solid yellow light. As still another example, the operation of the TCD's state machine may be adjusted to cause multiple TCDs of the TCD to be switched to flash red signals constantly, instead of a standard red→green→yellow→red sequence. It should be noted that here and elsewhere in this document other standard sequences are contemplated, for example, with an intermediate state between red and the immediately-following green, as well as sequences of two-color TCDs (red, green). The VTCD potential failures and their corresponding adjustments may be pre-stored in a mapping, for example, in the storage device(s) 110.

In step 695, the information regarding the detected malfunction(s) is transmitted to a remote facility. The transmitted information may include all or some of the data logged in the step 680, and possibly additional data. At the remote facility, the information may be examined automatically and/or by one or more persons (human resource(s), which may be crowdsourced), and a corrective action may be scheduled. The corrective action may be transmission of a maintenance request to an appropriate department/authority. The remote facility may also determine the appropriate mitigation until maintenance is performed, and transmit a corresponding command to the TCD; the TCD may then mitigate in accordance with the command.

The urgency of the maintenance request may vary with type of failure(s) and the information received from the TCD. Thus, in response to a malfunctioning red light, the TCD or the remote facility may assign a rotatively high priority to the maintenance request. As another example, in response to a green light that is marginally dimmer than required, the TCD or the remote facility may assign a relatively low priority to the request. The location of the TCD and the direction the VTCD with the failure faces may also affect the priority of the request; for example, the higher the traffic volume in the VTCD's direction, the higher the priority.

The process 600 may terminate at flow point 699, to be repeated as needed or desired.

Figure 7:
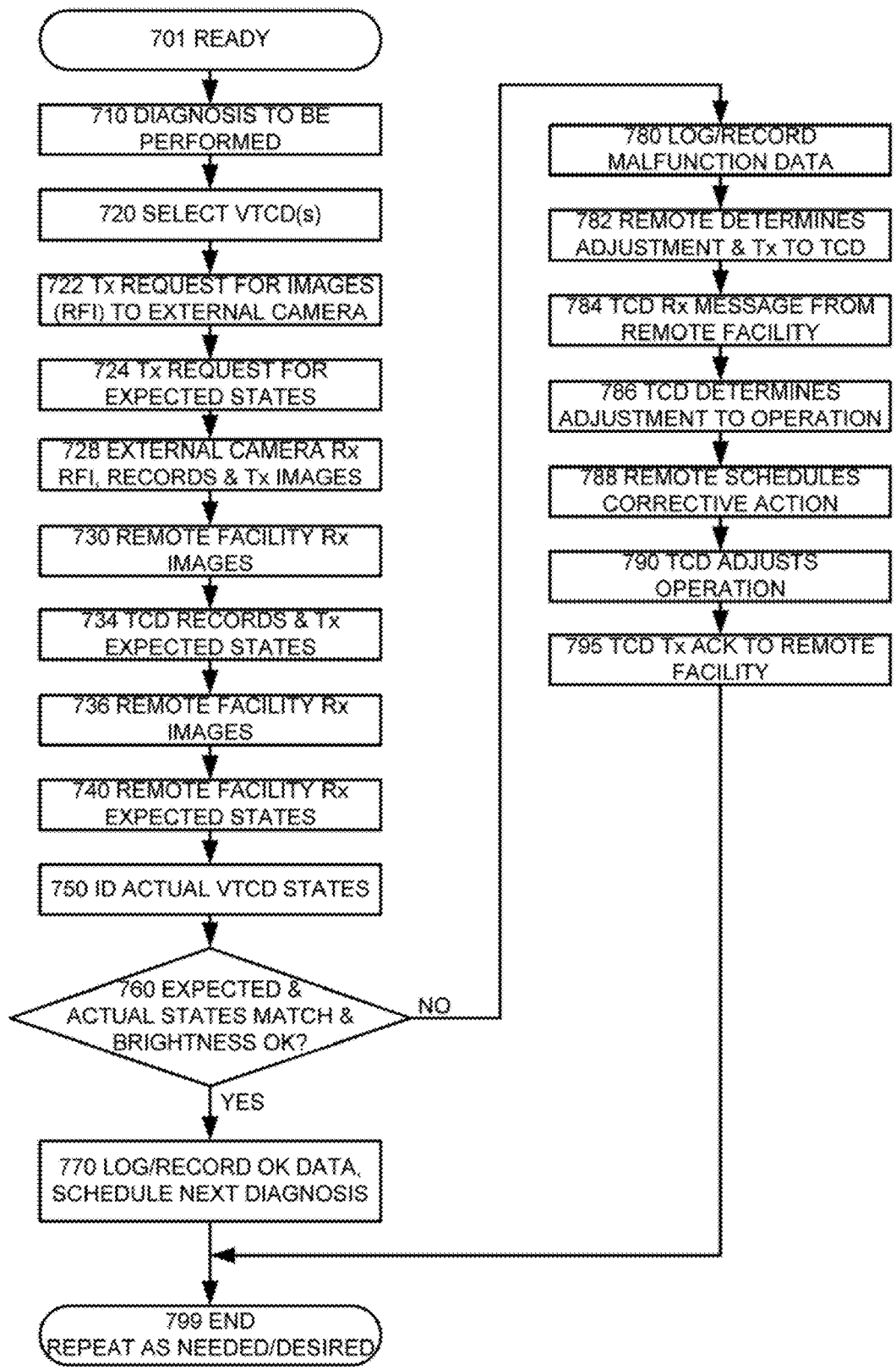
FIG. 7 illustrates selected steps/decision block of another process for identifying display-related faults in traffic control devices.

Many of the steps of the process 600 and similar/analogous steps may be performed by different devices. FIG. 7 illustrates selected steps of a process 700 for diagnosing display-related failures, in which process many of the steps are performed by the remote facility.

At flow point 701, the remote facility is ready. The TCD (e.g., the TCD 100) is also ready. e.g., powered-up, initialized, and operating, as is an external camera-equipped device and its camera that obtains the image(s) of the TCD's VTCD. (Multiple external cameras may participate in this process, but for simplicity singular "camera" is used below; and multiple VTCDs may be diagnosed by a single external camera or multiple external cameras, but for simplicity a singular "VTCD" is used).

In step 710, it is determined that diagnosing of the TCD should be performed. This determination may be made by the remote facility, by the external camera-equipped device, the TCD, yet another device, or a combination of devices. The process may be performed periodically, at random and/or predetermined times, in response to detection of some pattern or irregularity in traffic flow, in response to some internal TCD event such as detection of some pattern or irregularity in power/current flow into one or more VTCDs and/or one or more portions thereof a DTS commanding/requesting the diagnosing process, and/or in response to another type of event/stimulus. In embodiments, the TCD sends to the remote facility certain data related to the initiation of the process, such as the detection of pattern/irregularity in the traffic flow and/or in the power/current flow to the one or more VTCDs or elements thereof. The remote facility may then make the decision to initiate the process 700 based on the TCD data alone; based on the TCD data in combination with data from other devices such as data from other TCD(s), RSU(s), beacon(s), street light camera(s), and/or any combination of data from these and other sources.

Once the remote Facility makes the decision that the diagnosis/testing of should be performed and sends the DTS to the TCD, and possibly also to other device(s) involved in the process such as the external camera-equipped devices.

In step 720, the VTCD to be diagnosed is selected. For example, the remote facility may communicate to the TCD the particular VTCD to be diagnosed as part of the DTS, together with the DTS, or as a separately-transmitted information. In examples, however, the TCD itself selects the VTCD in a round robin fashion, randomly, in some predetermined order, or otherwise; the TCD may then transmit to the remote facility the identity of the VTCD selected for diagnostics. The step 720 may be similar or analogous to the step 620 described above in relation to the process 600.

In step 722, the remote facility transmits to the external camera-equipped device a request for image(s) ("RFI") of the selected VTCD. The image(s) are to be captured during a diagnostic period of time. The RFI may specify the diagnostic period.

In step 724, the remote facility transmits to the TCD a request to record and transmit back to the remote facility the expected states of the VTCD during the diagnostic period or part of the diagnostic period. Such request may be referred to as a "Request for Expected States" or "RFES." For example, the remote facility requests the slates of the VTCD as determined by the state machine of the TCD. The RFES may specify the diagnostic period.

In step 728, the external camera-equipped device receives the RFI, obtains/records the requested image(s), and transmits the image(s) to the remote facility, directly or indirectly. The image(s) may be time-stamped. The remote facility receives the image(s) responsive to the RFI, in step 730.

In step 734, the TCD records the expected state(s) of the VTCD during the diagnostic period or part of the diagnostic period. For example, the states of the VTCD as determined by the state machine of the TCD are recorded: the recorded states may be time-stamped. The TCD transmits to the remote facility the recording(s) of the expected state(s) ("RES"). Here as elsewhere in this document, the transmissions may be direct or indirect.

In step 736, the remote facility receives the image(s) from the external camera-equipped device.

In step 740, the remote facility receives the RES from the TCD.

In step 750, the remote facility processes the image(s), parsing the image(s) to recognize the area (or areas) showing the VTCD and identifying the VTCD's actual state(s) from the images. The remote facility may store the state(s) identified from the image(s) with their corresponding times (the time stamp(s) of the state(s) identified from the image(s)).

In decision block 760, the remote facility compares the expected states of the VTCD from the step 740 to the contemporaneous actual states of the VTCD identified in the step 750; additionally, the brightness of the VTCD may be evaluated to determine whether or not the brightness meets the requirement applicable to the TCD.

If the expected states and the contemporaneous states in the image(s) match and the brightness (if brightness is evaluated) meets the requirement, the process flow proceeds towards step 770, to log (record/store) the outcome of no malfunction detected, the particular VTCD diagnosed (from among the VTCDs of the TCD), and the time/date the VTCD diagnosis was performed. The time and/or date of the next diagnosis may be scheduled as well. The process 700 may terminate at flow point 799 to be repeated as needed or desired.

Otherwise, the process flow proceeds from the decision block 760 towards step 780, in which the remote facility logs the outcome of malfunction(s) detected, the particular VTCD affected, the type(s) of malfunction(s), the data relating to the malfunction(s) (which may include the image(s) and the corresponding states), and the time/date the diagnosis was performed and the malfunction(s) detected.

In step 782, the remote facility transmits to the TCD a message related to the malfunction(s). The message may contain identification of the VTCD affected by the malfunction, the type of malfunction (e.g., failed/dim elements) a request/command to adjust the TCD's operation to mitigate the malfunction(s), and the particular adjustment to be made as determined by the remote facility. The remote facility's determination of the particular adjustment may be based on the type of malfunction(s) and other information. For example, in response to a failure of a VTCD to turn green when needed, the remote facility may determine that the state machine of the TCD should be adjusted so that the green state of that malfunctioning VTCD is replaced by a flashing red light, a flashing yellow light, a solid yellow light: similarly, in response to a failure of a VTCD to turn red when needed, the remote facility may determine that the state machine should be adjusted so that the solid red state of that malfunctioning VTCD is replaced by a flashing red light, a flashing yellow light, a solid yellow light. As still another example, the remote facility may determine that the operation of the TCD's state machine should be adjusted to cause certain VTCD to flash red constantly instead of a red→green→yellow→red or another standard sequence. The VTCD potential failures and their corresponding adjustments may be pre-stored in a mapping, in storage device(s) of the remote facility.

In step 784, the TCD receives the message.

In step 786, the TCD determines the adjustment to its operation to be made, which may be, for example, the particular adjustment requested/commanded by the remote facility in steps 782/784. The TCD may also or instead determine what adjustment to the operation of its state machine should be for mitigation, based on the type of the malfunction(s) and/or other data. For example, in response to a failure of the VTCD to turn green when needed, the TCD may change the state machine so that the green state of that malfunctioning VTCD is replaced by a flashing red light, a flashing yellow light, a solid yellow light; similarly, in response to a failure of a VTCD to turn red when needed, the TCD may change the state machine so that the solid red state of that malfunctioning VTCD is replaced by a flashing red light, a flashing yellow light, a solid yellow light. As still another example, the operation of the TCD's state machine may be adjusted to cause certain VTCD(s) to flash red signals constantly instead of a red→green→yellow→red or another standard sequence. The VTCD potential failures and their corresponding adjustments may be pre-stored in a mapping, for example, in the storage device(s) 114) of the TCD.

In step 788, the remote facility may examine the failure-related information or causes the information to be examined, for example, automatically and/or by one or more persons, and schedules corrective action responsive to the failure(s) detected. The corrective action may include a transmission of a maintenance request to an appropriate department/authority.

The urgency of the maintenance request may vary with the type of failure(s), the data received from the TCD, and/or other information. Thus, in response to a malfunctioning red light, the TCD may assign a relatively high priority to the maintenance requests another example, in response to a green light that is marginally dimmer than required, the TCD may assign a relatively low priority to the request. The location of the TCD and the direction of the VTCD with the failure may also affect the priority of the request, for example, the more traffic in the VTCD's direction, the higher the priority.

In step 790, the TCD adjusts its operation to mitigate the problem(s) caused by the malfunctions), for example, in accordance with the determination of the step 782 or the step 786.

In step 795, the TCD transmits to the remote facility an acknowledgement of the receipt of the message and the adjustment made the acknowledgement may include the description of the adjustment made, particularly if the TCD has itself determined the type of adjustment and/or deviated from the adjustment requested/commanded in the message from the remote facility in the steps 782/784.

The process 700 may terminate at flow point 799, to be repeated as needed or desired.

Figure 8:
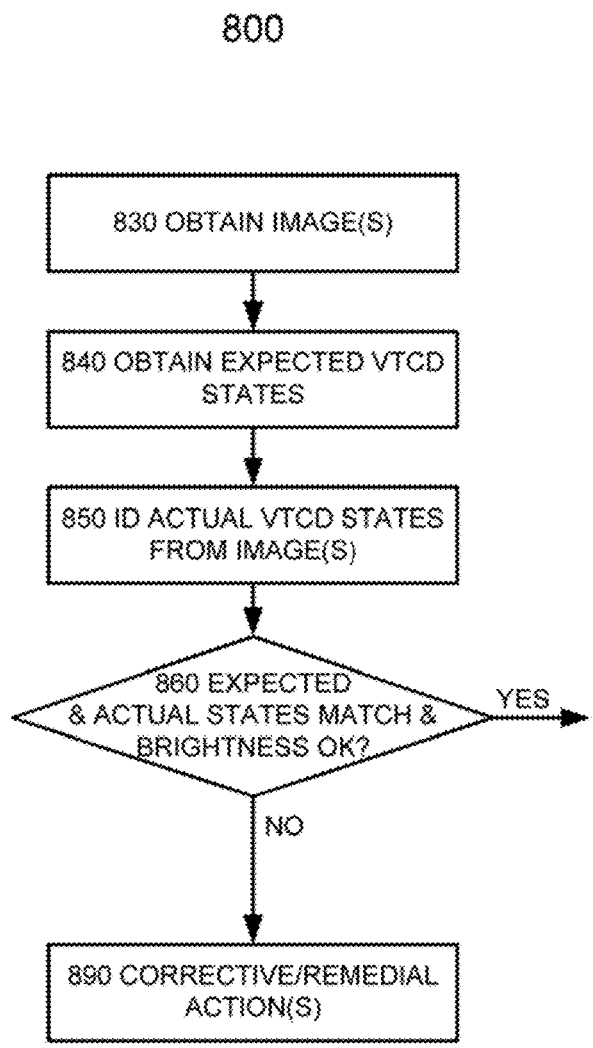
FIG. 8 illustrates selected steps/decision block of another process for identifying display related faults in traffic control devices.

FIG. 8 illustrates selected states of a more generalized process 800 for diagnosing TCD display failures. Here, once the decision to diagnose a particular VTCD is made, image(s) of the VTCD are taken during a diagnostic period of time from an external camera-equipped device with a view of the VTCD, in step 830. In step 840, the expected states of the VIM are obtained during the diagnostic period. In step 850, the images are processed to identify the actual states of the VTCD during the diagnostic period. In decision block 860, the expected VTCD states from the step 840 are compared to contemporaneous states of the VTCD identified from the images in the step 850, and if a mismatch exists, some corrective and/or remedial action(s) may be taken in step 890. A remedial action mitigates the particular failure(s) identified; it is an action that is expected to make traffic flow controlled by the TCD safer and/or less time-consuming on average. For example, in response to a failure of a VTCD to turn green when needed, the TCD may change the state machine so that the green state of that malfunctioning VTCD is replaced by a flashing red light, a flashing yellow light, a solid yellow light; similarly, in response to a failure of a VTCD to turn red when needed, the TCD may change the state machine so that the solid red state of that malfunctioning VTCD is replaced by a flashing red light, a flashing yellow light, a solid yellow light. As still another example, the operation of the TCD's state machine may be adjusted to cause certain VTCD(s) to be switched to flash red signals instead of a red→green→yellow→red or another sequence. The VTCD potential failures and their corresponding adjustments may be pre-stored in a mapping, in storage devices) of the remote facility.

A corrective action is an action expected to cause correction of the failure. For example a maintenance request may be sent to an appropriate department/authority, which in response schedules maintenance/repair. As another example, a signal is sent to a remote facility and the remote facility transmits a maintenance request to the appropriate department/authority, which schedules the maintenance/repair.

The processing of the step 850 may be performed by the TCD; by the remote facility (which may be a collection of devices); by the external camera-equipped device; by another device or system of devices with access to the expected states and the actual slates identified from the image(s).

Advantageously, the image(s) may be taken by ad hoc cameras, that is, mobile cameras in the vicinity of the TCD, such as camera-equipped devices of pedestrians/drivers/passengers (e.g., mobile smart phones, tablets, smart watches, smart glasses and other head-mounted camera-equipped devices, gaming devices, navigation devices, cameras of the vehicles in the vicinity, whether autonomous or not, and still other devices).

The TCD 100 may be configured to perform as a beacon, as is described, for example, in the related patent applications (Ser. No. 16/112,743 and Ser. No. 62/596,891) incorporated by reference. A beacon that is not a traffic control device may also be implemented as is described in the related patent applications. A beacon may be a stand-alone device or it may be combined with some other functionality and may include components shown in FIG. 1, likely though not necessarily without the visual traffic control display(s) 135, the camera(s) 130, and/or the interfaced) 140. But beacon functionality in the TCD 100 and/or the non-TCD beacon may also be implemented in other ways. Methods of position location and distance measurement include transponder-based techniques, and other techniques. See, generally, David Munoz et al., Position Location Techniques and Applications (1st Edition, ISBN-13: 978-1402076770), which book is hereby incorporated by reference in its entirety. A beacon may include VANET functionality, for example RSU functionality.

For beacon operation, the TCD 100 is configured to transmit (e.g., broadcast, multicast, or simply transmit to a particular device) through a transmitter 120B a beacon signal that carries information sufficient for an appropriately-configured receiver (such as a receiver of a vehicle computer, a smart phone or another communication/computing mobile device, a dedicated navigation device, a gaming device, smart glasses, or a similar device, generally designated as a "receiving device") to determine the distance from the receiving device to the TCD 100. This information, combined with the known geographic coordinates of the TCD 100. allows the vehicle receiver to determine its distance to the TCD 100 and its location, possibly with greater precision than would otherwise be possible. This is particularly useful in the presence of significant GPS multipath ("MP"), when GPS signals are blocked, when significant interference on the frequencies used by UPS is present, and when no OPS capability is available in the receiving device. But even when UPS works as designed, the distance measurement functionality may improve the location estimation capability of the receiving device. Note that, the receiving device may employ the distance measurement ("DM") techniques describe herein to measure distances to two or more beacons, and derive its location/position information from the multiple distance measurements, e.g., using trilateration and/or "other location information" as defined elsewhere in this document. Ambiguities may be resolved using various other information items, such as map information.

The TCD 100 may emit an RF signal modulated with two, three, or more lower frequency signals, with known phase relationship(s) between and/or among the lower frequency signals (at the transmitter 120B, at a predetermined or otherwise known time); the lower frequency signals may, for example, be periodically phase locked (directly or indirectly) to the same source, or one of them may serve as a reference to the other(s), or some may be derived from another (or others) such as by frequency multiplication and/or division. Frequency division may be fractional division. The receiving device may receive the transmission from the TCD 100, downconvert the received signal (to baseband or IF) to extract the lower frequency signals, and determine the relative phase shift(s) between/among the lower frequency signals. Recall that the phase relationships at the TCD 100 are fixed at the predetermined time, and may be known to the receiving device (e.g., by convention and/or information received from the TCD 100, perhaps together with the RF signal modulated by the lower frequency signals, or computed based on two phase differences as will be shown, or received/derived from another source). From this information and the measurement of the phases of the lower frequency signals at the receiving device, the receiving device (such as a vehicle computer-receiver) can calculate the distance to the TCD 100. Because the TCD 100 is relatively close to the vehicle that is approaching it, the MP and other distorting effects between the vehicle and the TCD 100 may be manageable and the computed receiving device-to-TCD 100 distance is likely to be very close to the actual distance. The TCD 100 may encode the information regarding the predetermined time and the phase relationships at the TCD 100 and its own location coordinates onto the signal that the TCD 100 transmits. As has already been mentioned, the transmission may be omnidirectional, directional, or directional in the horizontal plane; and it may be a broadcast or a multicast or another type of transmission.

In embodiments, the beacon emits a modulated high frequency signal. The frequency of the emitted high frequency signal may be, for example, in the tens of megahertz (>10 MHz) range, in the hundreds of megahertz (>100 MHz) range, and in the GHz (>1 GHz) range; and the modulating beacon frequencies (as related to beacon operation discussed herein) and the differences between and among them may be, for example, at least two, three, four, five, six, or even more orders of magnitude lower; in embodiments, the modulation frequencies are under 100 KHz; in embodiments, the modulation frequencies are under 10 KHz; in embodiments, the modulation frequencies are under 3 KHz; in embodiments, the differences between any two of the modulation frequencies are under 10 KHz, under 3 KHz, under 1 KHz. This type of frequency relationships helps ensure that the multiple frequencies in the modulation band are generally subjected to similar MP, Doppler shift, and other distorting effects, and also helps in resolving distance ambiguity due to phase rotation, as will be seen. The in-band low frequency modulation signals may be generated so that their phase difference at the time of arrival at the receiving device (such as an automobile with a vehicle computer) allows the receiver to compute the distance to the beacon to within a small uncertainty distance interval, for example, less than 15 meters (50 feet), less than five meters (16 feet), less than 1 meter (3.3 feet), less than 25 centimeters (10 inches), and in some examples even less. In embodiments, the ambiguity in the distance due to repeating wavelengths of the low frequency signals is much greater than what cannot be resolved based on "other location information" available to the receiver, as is discussed below; the ambiguity may be, for example, over one kilometer, over ten kilometers and greater, allowing for the ambiguity to be resolved using other location information or even avoiding the ambiguity altogether. Moreover, in embodiments, the receiving device need not have knowledge of the time the lower frequency signals were synchronized (their phase relationships were fixed), but can derive this information (time) from multiple relative phase shifts of the received lower frequency signals (such as three or more lower frequency signals) at the receiving device, and a known "synchronization scheme."

Beginning with the basic phase equation of a propagating sinusoidal wave of frequency f (angular frequency $\omega=2*\pi*f$) and wavelength $\lambda=c/f$ (c being the speed of propagation, i.e., speed of light in the air):

$$P = 2*\pi*\left(f*t - \frac{x}{\lambda}\right) + \phi,$$

where P is phase, t is time, x is distance, and $\varphi$ is the phase at t=0 and x=0. This is equation (1).

Consider two modulation frequencies/wavelengths $f_1/\lambda_1$ and $f_2/\lambda_2$ on a carrier $F_0/\lambda_0$, and emission from the beacon such that $f_1$ and $f_2$ are at the same given phase at the time/location of emission (i.e., $\varphi$ in equation (1), which can be assumed to be zero without loss of generality. The signals on the two frequencies may be synchronized in various ways, for a example, by simultaneously resetting feedback frequency dividers in phase locked loops or in synthesizers that generate the two frequencies. The corresponding wavelengths $\lambda_1$ and $\lambda_2$ are long relative to $\lambda_0$, and each wavelength corresponds to 360° or $2*\pi$ radians at its corresponding frequency. Thus one degree of phase shill due to travel is equivalent to a distance of $\lambda_1/360$ at $f_1$, and to a distance of $\lambda_2/360$ at $f_2$; one radian of phase shift is equivalent to a distance of $\lambda_1/(2\pi)$ at $f_1$, and to a distance of $\lambda_2/(2\pi)$ at $f_2$.

Defining P1 and P2 as the phases of $f_1$ and $f_2$, respectively, and substituting the variables into the phase equation (1) results in:

$$P1 = \left(2*\pi*\left(f_1*t - \frac{D}{\lambda_1}\right)\right) \text{ and } P2 = \left(2*\pi*\left(f_2*t - \frac{D}{\lambda_2}\right)\right). \quad (2)$$

Define $\Delta_{phA}=P1-P2$; $\Delta_{fA}=(f_1-f_2)$; and $\Delta_{\lambda A}=(\lambda_2-\lambda_1)$. The phase difference is given by:

$$\Delta_{phA} = \left(2*\pi*\left(f_1*t - \frac{D}{\lambda_1}\right)\right) - \left(2*\pi*\left(f_2*t - \frac{D}{\lambda_2}\right)\right) = \quad (3)$$

$$\left(2*\pi*\left((f_1-f_2)*t - \frac{D}{\lambda_1} + \frac{D}{\lambda_2}\right)\right) = 2*\pi*\left(\Delta_{fA}*t - \left(\frac{D}{\lambda_1} - \frac{D}{\lambda_2}\right)\right) =$$

$$2*\pi*\left(\Delta_{fA}*t - \left(\frac{D*(\lambda_2-\lambda_1)}{\lambda_1*\lambda_2}\right)\right) = 2*\pi*\left(\Delta_{fA}*t - \left(\frac{D*\Delta_{\lambda A}}{\lambda_1*\lambda_2}\right)\right).$$

Rearranging terms:

$$\Delta_{phA} = t*(2*\pi*\Delta_{fA}) - D*\left(\frac{2*\pi*\Delta_{\lambda A}}{\lambda_1*\lambda_2}\right), \text{ and} \quad (4)$$

$$D*\left(\frac{2*\pi*\Delta_{\lambda A}}{\lambda_1*\lambda_2}\right) = t*(2*\pi*\Delta_{fA}) - \Delta_{phA}. \quad (5)$$

The distance D can now be isolated:

$$D = \frac{(t*(2*\pi*\Delta_{fA}) - \Delta_{phA})*\lambda_1*\lambda_2}{2*\pi*\Delta_{\lambda A}}. \quad (6)$$

To estimate the distance D, the receiving device (at the vehicle, smart phone, etc.) needs to know t, which is the time elapsed from the moment $f_1$ and $f_2$ were synchronized at the beacon; this invokes two related problems. First, the receiving device needs to know when the beacon synchronizes $f_1$ and $f_2$ according to the beacon's time base (clock); second, because the receiving device and the beacon use different physical clocks, the times at the beacon and at the receiving device may differ; the beacon's time reference may not be known precisely by the receiving device. Still another problem is that $\Delta_{ph}$'s ($\Delta_{phA}$ and generally all phases and phase differences) are subject to ambiguity due to the rotating nature of phases: a phase difference of α degrees may appear the same as (α+n*360) degrees n being an integer; for example, 30 degrees may appear the same as 390 degrees, 750 degrees, etc.

These problems may become easier if the frequencies $f_1$ and $f_2$ are chosen so that they are low and close to each other. To give a concrete example, assume that $f_1$=1 KHz and $f_2$=1.1 KHz, with the corresponding wavelengths of these modulation frequencies being $\lambda_1$=300,000 meters and $\lambda_2$=272,727.27 . . . meters. Then, $\Delta_{phA}$ (in degrees)= 0.00012*D−36,000*t. This examples demonstrates that at a given distance $D_1$ the phase difference $\Delta_{ph}$ rotates at 100 Hz, and at a given time $t_1$ the phase difference repeats every 3,000,000 meters. More generally, the phase differential $\Delta_{ph}$ rotates (at a set distance from the beacon) at the frequency $\Delta_{fA}$, the difference between the two frequencies $f_1$ and $f_2$; and the phase differential $\Delta_{ph}$ repeats (at a set time) at the distance of $$\frac{c}{\Delta_f},$$

c being the speed of light. Thus, $\Delta_f$ can be thought of as the "frequency" of the phase difference at a given distance; and $$\frac{c}{\Delta_f}$$

can be thought of as the "wavelength" of the phase difference.

The concrete example of the preceding paragraph illustrates that the ambiguity due to the rotation of the phases may be resolved by choosing the $f_1$ and $f_2$ frequencies properly; 300,000 meters (which is ten times less than the ambiguity distance computed above) or about 180 miles is a sufficiently long distance to be resolved by a great many types of "other location information"; indeed, given the range of transmissions from TCD beacons and other beacons, there, may be no real ambiguity in the first place. Thus, in embodiments, the "frequency" of the phase difference is selected so that the "wavelength" a the phase difference is much greater (>×10) than the maximum design range of the beacon transmissions; in embodiments, the "frequency" of the phase difference is selected so that the "wavelength" of the phase difference is greater than 1 kilometer; greater than 10 kilometers; greater than 2.5 kilometers; greater than 100 kilometers, as is the case in the concrete example above; and greater than 1000 kilometers. When more than two frequencies are involved, such as in the cases of three frequencies ($f_1$, $f_2$, $f_3$) and four frequencies ($f_1$, $f_2$, $f_3$, $f_4$) discussed below, the same limitations on the frequencies may be applied to all of them and to each of the frequency differences between each pair of such frequencies.

Turning next to the three-frequency case, introduce a new modulation frequency $f_3$ (such that, for convenience of discussion, $\lambda_1 < \lambda_2 <$, $\lambda_1 < \lambda_3$, and therefore $f_1 > f_2$, $f_1 < f_3$, and $f_2 \neq f_3$). At time t and distance D, the phase $f_3$ is:

$$P3 = \left(2*\pi*\left(f_3*t - \frac{D}{\lambda_3}\right)\right). \tag{7}$$

Here are the additional definitions for this three-frequency ease: $\Delta_{phB}$=P1-P3; $\Delta_{fB}$=($f_1$-$f_3$); $\Delta_{\lambda B}$=($\lambda_3$-$\lambda_1$). With these definitions, the following should hold, with the distance D being the same whether measured based on the phase difference $\Delta_{phB}$ or the phase difference $\Delta_{phA}$:

$$D = \frac{(t*(2*\pi*\Delta_{fB}) - \Delta_{phB})*\lambda_1*\lambda_3}{2*\pi*\Delta_{\lambda B}} = \frac{(t*(2*\pi*\Delta_{fA}) - \Delta_{phA})*\lambda_1*\lambda_2}{2*\pi*\Delta_{\lambda A}}. \tag{8}$$

Re-writing, rearranging, and isolating t obtains:

$$\frac{t*2*\pi*\Delta_{fB}*\lambda_1*\lambda_3}{2*\pi*\Delta_{\lambda B}} - \frac{\Delta_{phB}*\lambda_1*\lambda_3}{2*\pi*\Delta_{\lambda B}} = \tag{9}$$
$$\frac{t*2*\pi*\Delta_{fA}*\lambda_1*\lambda_2}{2*\pi*\Delta_{\lambda A}} - \frac{\Delta_{phA}*\lambda_1*\lambda_2}{2*\pi*\Delta_{\lambda A}};$$

$$t*\left(\frac{\Delta_{fB}*\lambda_1*\lambda_3}{\Delta_{\lambda B}} - \frac{\Delta_{fA}*\lambda_1*\lambda_2}{\Delta_{\lambda A}}\right) = \frac{\Delta_{phB}*\lambda_1*\lambda_3}{2*\pi*\Delta_{\lambda B}} - \frac{\Delta_{phA}*\lambda_1*\lambda_2}{2*\pi*\Delta_{\lambda A}}; \tag{10}$$

$$t*\left(\frac{\Delta_{fB}*\lambda_1*\lambda_3*\Delta_{\lambda A} - \Delta_{fA}*\lambda_1*\lambda_2*\Delta_{\lambda B}}{\Delta_{\lambda B}*\Delta_{\lambda A}}\right) = \tag{11}$$
$$\frac{(\Delta_{phB}*\lambda_1*\lambda_3*\Delta_{\lambda A} - \Delta_{phA}*\lambda_1*\lambda_2*\Delta_{\lambda B})}{2*\pi*\Delta_{\lambda B}*\Delta_{\lambda A}}; \text{ and}$$

$$t = \frac{(\Delta_{phB}*\lambda_1*\lambda_3*\Delta_{\lambda A} - \Delta_{phA}*\lambda_1*\lambda_2*\Delta_{\lambda B})*\Delta_{\lambda B}*\Delta_{\lambda A}}{2*\pi*\Delta_{\lambda B}*\Delta_{\lambda A}*(\Delta_{fB}*\lambda_1*\lambda_3*\Delta_{\lambda A} - \Delta_{fA}*\lambda_1*\lambda_2*\Delta_{\lambda B})} = \tag{12}$$
$$\frac{(\Delta_{phB}*\lambda_3*\Delta_{\lambda A} - \Delta_{phA}*\lambda_2*\Delta_{\lambda B})}{2*\pi*(\Delta_{fB}*\lambda_3*\Delta_{\lambda A} - \Delta_{fA}*\lambda_2*\Delta_{\lambda B})}.$$

Note that in the last equation, the frequencies f's, the associated wavelengths λ's, and their differences and $\Delta_{fA}/\Delta_{fB}$ and $\Delta_{\lambda A}/\Delta_{\lambda B}$ should be known to the receiving device, and the phase differences $\Delta_{phA}$ and $\Delta_{phB}$ (the $f_1$-to-$f_2$ and $f_1$-to-$f_3$ phase differences) are measurable by the receiving device. The receiving device can therefore compute t, e.g., from equation (12), and then D from, e.g., equation (8).

To avoid ambiguity due to the repeating nature of phase change, the maximum operational distances and the frequencies ($f_1$, $f_2$, $f_3$) may be selected appropriately. Thus, as with the concrete example above, the frequency difference $\Delta_{fB}$ may be made small, such as of the order of or equal to $\Delta_{fA}$. Recall that $\Delta_{fA}$ was 100 Hz in the concrete example, and the phase differential repeated at the distance of $$\frac{c}{\Delta_f}.$$

To extend the concrete example, $f_3$ may be set to 1.2 KHz, and $\Delta_{fB}$ should then repeat (at a set time) every 1,500,000 meters; recall that $\Delta_{fA}$ repeats every 3,000,000 meters. Thus ambiguity should not be a problem with appropriately-selected in frequencies and frequency spacings.

The use of three modulation frequencies ($f_1$, $f_2$, $f_3$) can be extended to, for example, four modulation frequencies ($f_1$, $f_2$, $f_3$, $f_4$) with their corresponding wavelengths ($\lambda_1$, $\lambda_2$, $\lambda_3$, $\lambda_4$). For convenience, let $\lambda_4 < \lambda_3$ and therefore $f_4 > f_3$. If the phase of the frequency $f_4$, P4, is also synchronized simultaneously with the phases of $f_1$, $f_2$, $f_3$ at the beacon, and the phases are measured at the same receiving device at the same time, then $$P3 = \left(2*\pi*\left(f_3*t - \frac{D}{\lambda_3}\right)\right); \text{ and } P4 = \left(2*\pi*\left(f_4*t - \frac{D}{\lambda_4}\right)\right).$$

These are equations (13).

Similar to the symbolism used above, define $\Delta_{phB}$=P4-P3; $\Delta_{fB}$=($f_4$-$f_3$); and $\Delta_{\lambda B}$=($\lambda_3$-$\lambda_4$). Rewriting equations (13) above to express the phase difference between P4 and P3:

$$P4 - P3 = \Delta_{phB} = \left(2*\pi*\left(f_4*t - \frac{D}{\lambda_4}\right)\right) - \left(2*\pi*\left(f_3*t - \frac{D}{\lambda_3}\right)\right) = \tag{14}$$
$$t*2*\pi*(f_4 - f_3) - D*2*\pi*\left(\frac{1}{\lambda_4} - \frac{1}{\lambda_3}\right).$$

Re-writing, rearranging, and isolating t obtains:

$$\Delta_{phB} = t*2*\pi*\Delta_{fB} - D*2*\pi*\frac{\lambda_3 - \lambda_4}{\lambda_4*\lambda_3} \tag{15}$$
$$= t*(2*\pi*\Delta_{fB}) - D*\left(2*\pi*\frac{\Delta_{\lambda B}}{\lambda_4*\lambda_3}\right);$$

$$D*\left(2*\pi*\frac{\Delta_{\lambda B}}{\lambda_4*\lambda_3}\right) = t*(2*\pi*\Delta_{fB}) - \Delta_{phB}; \tag{16}$$

$$D = \frac{(t*(2*\pi*\Delta_{fB}) - \Delta_{phB})*\lambda_4*\lambda_3}{2*\pi*\Delta_{\lambda B}} = \tag{17}$$
$$\frac{(t*(2*\pi*\Delta_{fA}) - \Delta_{phA})*\lambda_1*\lambda_2}{2*\pi*\Delta_{\lambda A}};$$

$$\frac{(t*(2*\pi*\Delta_{fB}) - \Delta_{phB})*\lambda_4*\lambda_3}{\Delta_{\lambda B}} = \frac{(t*(2*\pi*\Delta_{fA}) - \Delta_{phA})*\lambda_1*\lambda_2}{\Delta_{\lambda A}}; \tag{18}$$

$$(t*(2*\pi*\Delta_{fB}) - \Delta_{phB})*\lambda_4*\lambda_3*\Delta_{\lambda A} = \tag{19}$$
$$(t*(2*\pi*\Delta_{fA}) - \Delta_{phA})*\lambda_1*\lambda_2*\Delta_{\lambda B};$$

$$t*2*\pi*(\Delta_{fB}*\lambda_4*\lambda_3*\Delta_{\lambda A} - \Delta_{fA}*\lambda_1*\lambda_2*\Delta_{\lambda B}) = \tag{20}$$
$$\Delta_{phB}*\lambda_4*\lambda_3*\Delta_{\lambda A} - \Delta_{phA}*\lambda_1*\lambda_2*\Delta_{\lambda B}; \text{ and}$$

$$t = \frac{(\Delta_{phB}*\lambda_4*\lambda_3*\Delta_{\lambda A} - \Delta_{phA}*\lambda_1*\lambda_2*\Delta_{\lambda B})}{2*\pi*(\Delta_{fB}*\lambda_4*\lambda_3*\Delta_{\lambda A} - \Delta_{fA}*\lambda_1*\lambda_2*\Delta_{\lambda B})}. \tag{21}$$

In the last equation. $\Delta_{phA}$, and $\Delta_{phB}$, the $f_1$-to-$f_2$ and $f_4$-to-$f_3$ phase differences, are measurable at the receiving device, and the ether parameters (the wavelengths, frequencies, and their differences) are known. Therefore, t, the time elapsed from synchronization of the phases of the frequencies can be computed, e.g., from equation (21). The distance D can then be computed, e.g., from equation (17).

Recall that in the above it was assumed that the phases of the frequencies ($f_1$, $f_2$, $f_3$) and ($f_1$, $f_2$, $f_3$, $f_4$) were synchronized by setting them to the same value at t=0, at the beacon. It was assumed that the phase value was zero, but as a person skilled in the art would understand after careful perusal of this document and the attached drawings, all that is needed is for the receiving device to know the scheme for setting the phases to known values at beacon times that the receiving device knows or can obtain. Based on this knowledge (of times and corresponding phases at the beacon), the knowledge of the frequencies/wavelengths, and the measured phase differences, the receiving, device can compute the distance D for arbitrary (but known) initial phases. Extending the three-frequency case above ($f_1$, $f_2$, and $f_3$) so that each frequency signal has its own phase $\varphi$, the equations for the phases become:

$$P1 = \left(2*\pi*\left(f_1*t - \frac{D}{\lambda_1}\right) + \phi_1\right); \tag{22}$$

$$P2 = \left(2*\pi*\left(f_2*t - \frac{D}{\lambda_2}\right) + \phi_2\right); \text{ and} \tag{23}$$

$$P3 = \left(2*\pi*\left(f_3*t - \frac{D}{\lambda_3}\right) + \phi_3\right). \tag{24}$$

Let $f_1 > f_2$ and $\lambda_2 > \lambda_1$, $\lambda_1 < \lambda_3$ and therefore $f_1 > f_3$ and $f_2 \neq f_3$; and as before, define $\Delta_{phA}$=P1-P2; $\Delta_{fA}$=($f_1$-$f_2$); $\Delta_{\lambda A}$=($\lambda_2$-$\lambda_1$); $\Delta_{phB}$=P1-P3; $\Delta_{fB}$=($f_1$-$f_3$); $\Delta_{\lambda B}$=($\lambda_3$-$\lambda_1$). Also define: $\Delta_{\phi A}$=($\phi_1$-$\phi_2$); $\Delta_{\phi B}$=($\phi_1$-$\phi_3$). These equations now follow:

$$\Delta_{phA} = \tag{25}$$
$$P1 - P2 = \left(2*\pi*\left(f_1*t - \frac{D}{\lambda_1}\right)\right) - \left(2*\pi*\left(f_2*t - \frac{D}{\lambda_2}\right)\right) + (\phi_1 - \phi_2);$$

$$\Delta_{phA} = \left(2*\pi*\left((f_1 - f_2)*t - \frac{D}{\lambda_1} + \frac{D}{\lambda_2}\right)\right) + (\phi_1 - \phi_2); \tag{26}$$

$$\Delta_{phA} = \left(2*\pi*\left(\Delta_{fA}*t - \frac{D}{\lambda_1} + \frac{D}{\lambda_2}\right) + \Delta_{\phi A}\right); \tag{27}$$

$$\Delta_{phA} = t*(2*\pi*\Delta_{fA}) - D*2*\pi*\frac{\lambda_2 - \lambda_1}{\lambda_1*\lambda_2} + \Delta_{\phi A} = \tag{28}$$
$$t*(2*\pi*\Delta_{fA}) - D*2*\pi*\left(\frac{\Delta_{\lambda A}}{\lambda_1*\lambda_2}\right) + \Delta_{\phi A};$$

$$D*2*\pi*\left(\frac{\Delta_{\lambda A}}{\lambda_1*\lambda_2}\right) = t*(2*\pi*\Delta_{fA}) + \Delta_{\phi A} - \Delta_{phA}; \tag{29}$$

$$D = t*\left(\frac{2*\pi*\Delta_{fA}*\lambda_1*\lambda_2}{2*\pi*\Delta_{\lambda A}}\right) + \frac{(\Delta_{\phi A} - \Delta_{phA})*\lambda_1*\lambda_2}{2*\pi*\Delta_{\lambda A}} = \tag{30}$$
$$\frac{(T*(2*\pi*\Delta_{fA}) - (\Delta_{phA} - \Delta_{\phi A}))*\lambda_1*\lambda_2}{2*\pi*\Delta_{\lambda A}};$$

$$D = \frac{(t*(2*\pi*\Delta_{fB}) - (\Delta_{phB} - \Delta_{\phi B}))*\lambda_1*\lambda_3}{2*\pi*\Delta_{\lambda B}} = \tag{31}$$
$$\frac{(t*(2*\pi*\Delta_{fA}) - (\Delta_{phA} - \Delta_{\phi A}))*\lambda_1*\lambda_2}{2*\pi*\Delta_{\lambda A}};$$

$$t*2*\pi*\Delta_{fB}*\lambda_1*\lambda_3*\Delta_{\lambda A} - (\Delta_{phB} - \Delta_{\phi B})*\lambda_1*\lambda_3*\Delta_{\lambda A} = \tag{32}$$
$$t*2*\pi*\Delta_{fA}*\lambda_1*\lambda_2*\Delta_{\lambda B} - (\Delta_{phA} - \Delta_{\phi A})*\lambda_1*\lambda_2*\Delta_{\lambda B};$$

$$t*2*\pi*(\Delta_{fB}*\lambda_1*\lambda_3*\Delta_{\lambda A} - \Delta_{fA}*\lambda_1*\lambda_2*\Delta_{\lambda B}) = \tag{33}$$
$$(\Delta_{phB} - \Delta_{\phi B})*\lambda_1*\lambda_3*\Delta_{\lambda A} - (\Delta_{phA} - \Delta_{\phi A})*\lambda_1*\lambda_2*\Delta_{\lambda B}; \text{ and}$$

$$t = \frac{(\Delta_{phB} - \Delta_{\phi B})*\lambda_3*\Delta_{\lambda A} - (\Delta_{phA} - \Delta_{\phi A})*\lambda_2*\Delta_{\lambda B}}{2*\pi*(\Delta_{fB}*\lambda_3*\Delta_{\lambda A} - \Delta_{fA}*\lambda_2*\Delta_{\lambda B})}. \tag{34}$$

Given the knowledge of the frequencies/wavelengths and the initial phases ($\phi_1$, $\phi_2$, $\phi_3$) and therefore their differences ($\Delta_{\phi A}$, $\Delta_{\phi B}$), and given the measured phase differences at the receiving device ($\Delta_{phA}$, $\Delta_{phB}$), the receiving device can calculate the time t from, e.g., equation (34), and then the distance D from, e.g., equation (30).

Extending the four-frequency case above ($f_1$, $f_2$, $f_3$, and $f_4$) so that each frequency signal has its own initial phase $\phi$ (at t=0, x=0), the equations for the phases are:

$$P1 = \left(2*\pi*\left(f_1*t - \frac{D}{\lambda_1}\right) + \phi_1\right); \quad (35)$$

$$P2 = \left(2*\pi*\left(f_2*t - \frac{D}{\lambda_2}\right) + \phi_2\right); \quad (36)$$

$$P3 = \left(2*\pi*\left(f_3*t - \frac{D}{\lambda_3}\right) + \phi_3\right); \text{ and} \quad (37)$$

$$P4 = \left(2*\pi*\left(f_4*t - \frac{D}{\lambda_4}\right) + \phi_4\right). \quad (38)$$

For convenience, let $f_1 > f_2$, $f_4 > f_3$, $\lambda_2 > \lambda_1$, $\lambda_1 < \lambda_3$; and define P1-P2, $\Delta_{fA} = (f_1 f_2)$, $\Delta_{\lambda A} = (\lambda_2 - \lambda_1)$, $\Delta_{phB} = P4\text{-}P3$, $\Delta_{fB} = (f_4 - f_3)$; $\Delta_{\lambda B} = (\lambda_3 - \lambda_4)$, $\Delta_{\phi A} = (\phi_1 - \phi_2)$, $\Delta_{\phi B} = (\phi_4 - \phi_3)$. These equations now follow:

$$\Delta_{phA} = \quad (39)$$
$$P1\text{-}P2 = t*(2*\pi)*(f_1 - f_2) - \left(D*\left(\frac{2*\pi}{\lambda_1} - \frac{2*\pi}{\lambda_2}\right)\right) + \phi_1 - \phi_2;$$

$$\Delta_{phA} = t*2*\pi*\Delta_{fA} - D*2*\pi*\left(\frac{\lambda_2 - \lambda_1}{\lambda_1 * \lambda_2}\right) + \Delta_{\phi A}; \quad (40)$$

$$\Delta_{phA} = t*2*\pi*\Delta_{fA} - D*2*\pi*\left(\frac{\Delta_{\lambda A}}{\lambda_1 * \lambda_2}\right) + \Delta_{\phi A}; \quad (41)$$

$$\Delta_{phB} = t*2*\pi*\Delta_{fB} - D*2*\pi*\left(\frac{\Delta_{\lambda B}}{\lambda_4 * \lambda_3}\right) + \Delta_{\phi B}; \quad (42)$$

$$D = t*\frac{2*\pi*\Delta_{fA}*\lambda_1*\lambda_2}{2*\pi*\Delta_{\lambda A}} + \frac{(\Delta_{\phi A} - \Delta_{phA})*\lambda_1*\lambda_2}{2*\pi*\Delta_{\lambda A}} = \quad (43)$$
$$t*\frac{2*\pi*\Delta_{fB}*\lambda_4*\lambda_3}{2*\pi*\Delta_{\lambda B}} + \frac{(\Delta_{\phi B} - \Delta_{phB})*\lambda_4*\lambda_3}{2*\pi*\Delta_{\lambda B}};$$

$$t*\frac{2*\pi*(\Delta_{fA}*\lambda_1*\lambda_2*\Delta_{\lambda B} - \Delta_{fB}*\lambda_4*\lambda_3*\Delta_{\lambda A})}{2*\pi*\Delta_{\lambda A}*\Delta_{\lambda B}} = \quad (44)$$
$$\frac{(\Delta_{\phi B} - \Delta_{phB})*\lambda_4*\lambda_3*\Delta_{\lambda A} - (\Delta_{\phi A} - \Delta_{phA})*\lambda_1*\lambda_2*\Delta_{\lambda B}}{2*\pi*\Delta_{\lambda A}*\Delta_{\lambda B}}; \text{ and}$$

$$t = \frac{((\Delta_{\phi B} - \Delta_{phB})*\lambda_4*\lambda_3*\Delta_{\lambda A} - (\Delta_{\phi A} - \Delta_{phA})*\lambda_1*\lambda_2*\Delta_{\lambda B})}{2*\pi*(\Delta_{fA}*\lambda_1*\lambda_2*\Delta_{\lambda B} - \Delta_{fB}*\lambda_4*\lambda_3*\Delta_{\lambda A})}. \quad (45)$$

The time t can be computed, e.g., from the last equation, given the receiving device's knowledge of (i) the predetermined frequencies ($f_3$, and $f_4$), their corresponding wavelengths $\lambda_1 \lambda_2$, $\lambda_3$, and $\lambda_4$), the frequency and wavelength differences $\Delta_{fA}/\Delta_{fB}$ and $\Delta_{\lambda A}/\Delta_{\lambda B}$; (ii) the measured phase differences $\Delta_{phA}$ and $\Delta_{phB}$: and (iii) the knowledge of the initial phases ($\phi_1$, $\phi_2$, $\phi_3$, $\phi_4$, and/or information from which the initial phases can be determined at the receiving device) and their differences $\Delta_{\phi A}/\Delta_{\phi B}$. The distance, D, Can then be computed at the receiving device, e.g., from equation (43). The initial phases ($\phi_1$, $\phi_2$, $\phi_3$, $\phi_4$ in case of a four-frequency implementation or $\phi_1$, $\phi_2$, $\phi_3$ in case of a three-frequency implementation) may be set (be predetermined) by convention so that the receiving device (and possibly other receiving devices) knows them a priori; they may also be transmitted (broadcast, multicast, otherwise transmitted), for example, by the TCD/beacon and/or other system services. In embodiments, the TCD/beacon transmits the initial phases (synchronization scheme) in the signal on $F_0$, possibly together with other information; thus, the modulation signals using the frequencies used for DM ($f_1$, $f_2$, $f_2$, or $f_1$, $f_2$, $f_3$, $f_4$) may be transmitted together with the additional information, including the initial phases. Similarly, when the initial phases of the signals are the same (e.g., zero degrees or the same non-zero value), this information may also be transmitted by the TCD/beacon or otherwise, or pre-set by convention. Additionally, the coordinates of the TCD beacon may be transmitted in the same manner or otherwise. The zero phase value for the multiple modulation frequencies (at t=0, D=0) and the simultaneous synchronization of the modulation frequencies, however, are convenient for computational purposes and also for ease of hardware implementation. It may also be convenient to use three frequencies rather than four or more, though addition of a fourth frequency provides redundancy and allows a consistency check to be performed by computing the distance from different frequency deltas.

Figure 4A:
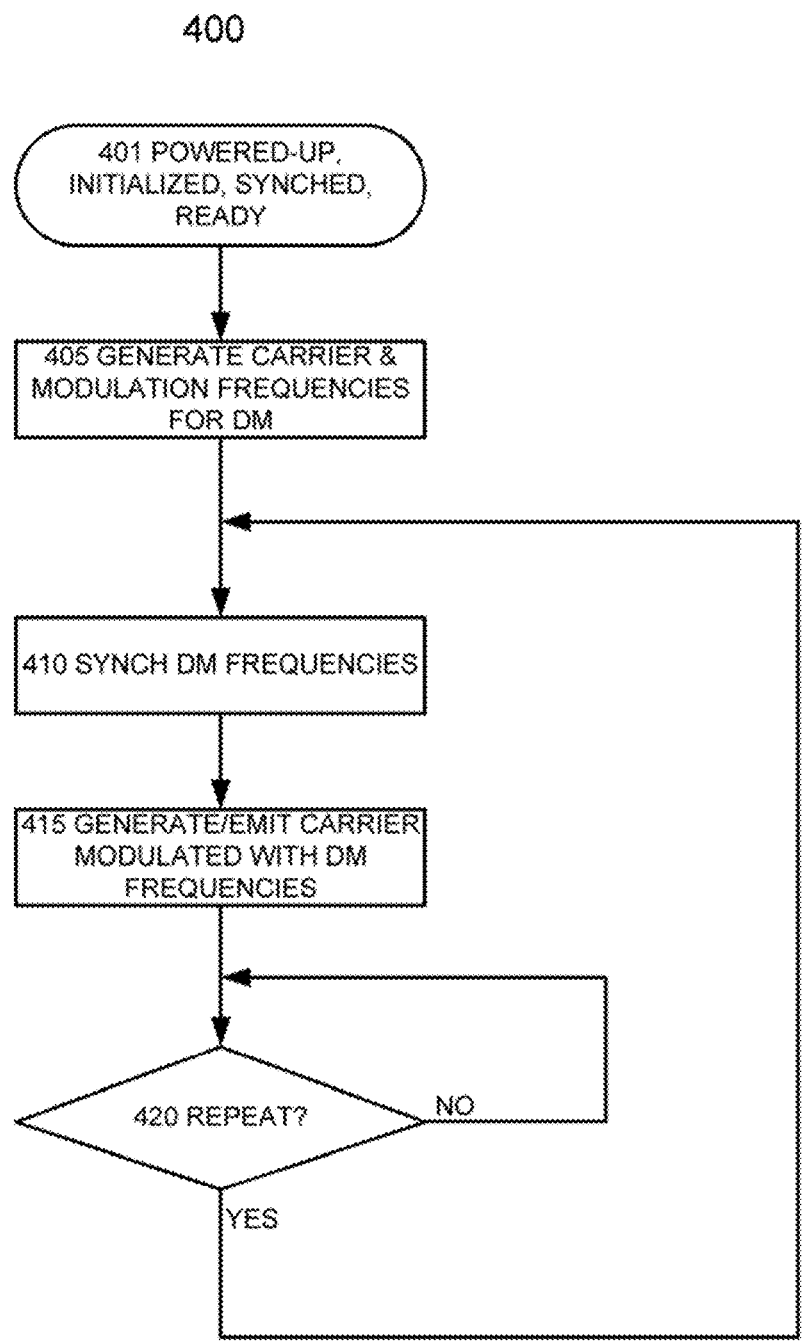
FIG. 4A illustrates selected steps/decision blocks of a process for transmitting signals that facilitate distance measurement.

FIG. 4A illustrates selected steps and decision block of a process 400 for transmitting signals that facilitate distance measurement. The process 400 may be performed, for example, at a beacon such as the TCD 100 or a non-TCD beacon.

At flow point 401, the beacon is powered-up, initialized, synchronized tag, to a GPS clock), and ready to perform the steps of the process.

In step 405, the beacon generates a carrier ($F_0$) and multiple low and closely-spaced modulation frequencies used for distance measurement ($f_1$, $f_2$, $f_3$, ... ).

In step 410, the beacon synchronizes the phases of the multiple low modulation frequencies. The multiple modulation frequencies may be synchronized at a predetermined time, for example, according to a schedule known to multiple receivers (vehicle computers, smart phones, navigation devices, etc.); this may be done periodically to avoid ambiguity in phase due to passage of time and the consequent phase rotation; as was seen in the derivation of the equations above, the receiving device might operate without precise knowledge of the time of synchronization of the phases, as long as the ambiguity is avoided. The phases may be set to the same value. e.g., zero degrees/radians, or to another value known or obtainable by the receiving device(s), or the respective phases of the different signals may be set to different values (for the different modulation frequencies f) known to or obtainable by the receiving device(s). Thus, as used in this context, "synchronizing" means setting the phases at the beacon to known/predetermined values; "synchronizing" to the same phase value means that the phases of the three or more frequencies f's are each set to the same value, which may but need not be zero degrees/radians; more generally, "synchronizing" may set each of the frequencies f to a known/predetermined phase value, and the phase values need not be the same. The receiving device should know the phase relationships between frequency pairs at the beacon, and the times when synchronizations take place so that the receiving device can compute the distance D from the three or four phases (P1, P2, P3; or P1, P2, P3, P4) measured by the receiving device, as was shown above; in this document, data sufficient for this purpose is referred to as the "synchronization scheme" of the DM transmission.

In step 415, the beacon generates and emits a carrier signal modulated with the multiple synchronized frequencies. The signal may be of relatively short duration, such as a few milliseconds (e.g., 1-100 milliseconds); the duration may also be longer, and shorter durations are not necessarily excluded; in embodiments, however, the duration is at least as long, as a large portion (e.g. >20%) of the period of the lowest of the modulation frequencies used for distance measurement, and in embodiments, the duration is longer than the period, for example, at least several (say 3-20) periods of the lowest of the modulation frequencies $f_n$; other durations are not necessarily excluded. The emitted signal may include additional data, for example: a unique identifier of the beacon, geographic coordinates of the beacon, the "synchronization scheme," the "TCD state" and "time to"/ "likelihood of" change in the state data described below, and still other data. The additional data may also or instead be transmitted separately, using another signal emitted by the beacon.

In decision block 420, the beacon determines whether time has come to repeat the steps 410/415. If the time to repeat has come, process flow returns to the step 410, for re-synchronization. Otherwise, the process flow continues to loop in the decision block 420. Thus, this decision block may be essentially a wait loop, though the beacon and other apparatus may be performing other steps at the same time, which is generally the case with all steps/decision described in this document. The synchronization of the step 410 and the generation/emission of the step 415 may be performed periodically, for example, between every 100 milliseconds to every few (e.g., one-to-ten) seconds. Other periods are not necessarily excluded. Generally, the process may be repeated so that the receiving device(s) using the beacon's signal for distance measurement may update their distance measurements in real time, such as before their location changes by more than a few meters at fastest moving speeds expected in the beacon's vicinity (reach of the beacon's transmission of the step 415).

Figure 4B:
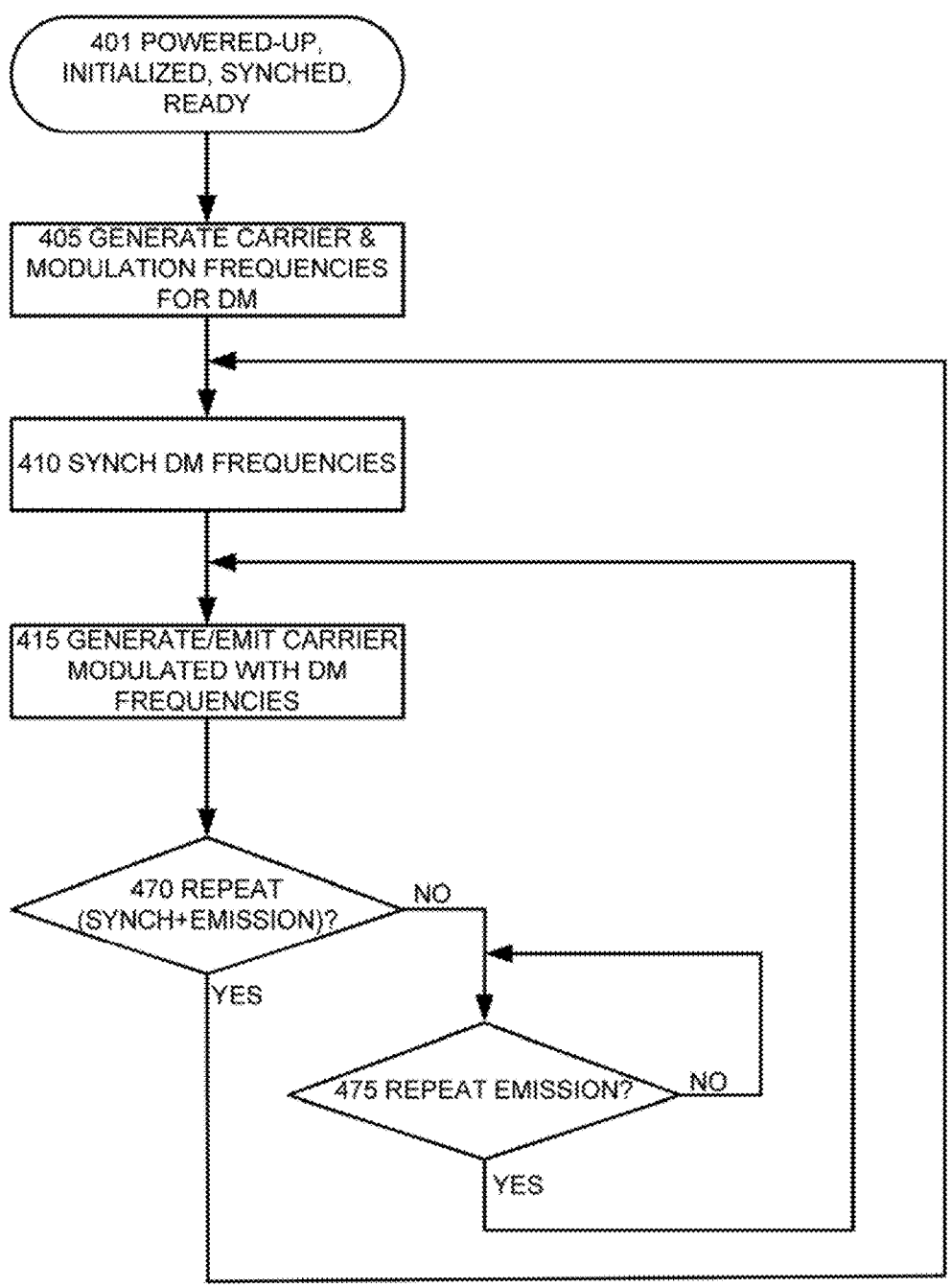
FIG. 4B illustrates selected steps/decision blocks of another process for transmitting signals that facilitate distance measurement.
Figure 5:
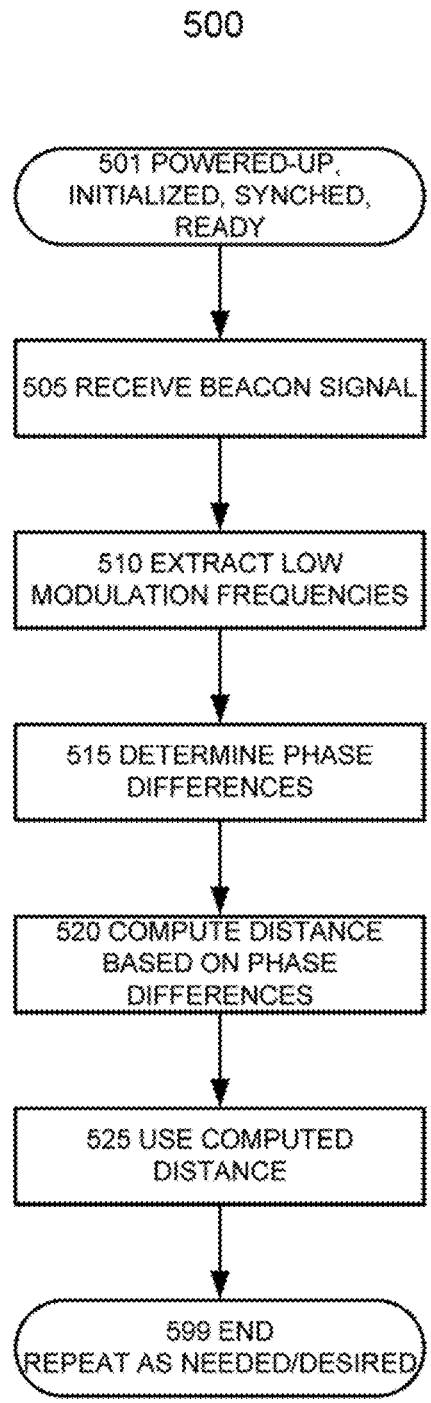
FIG. 5 illustrates selected steps of a process for receiving beacon signals and transmitting distance between a receiving device and a beacon.

In variants, the step 415 is repeated more often than the step 410, i.e., two or more emissions in the step 415 are performed following the synchronization of the step 410. FIG. 4B illustrates selected steps and decision blocks of a process 450 implementing this technique, FIG. 5 illustrates selected steps of a process 500 for estimating distance between a receiving device and a beacon. The process 500 may be performed, for example, by a vehicle computer, smart phone, computer, tablet, a dedicated navigation device, or another device. Generally, the receiving device is a mobile (here meaning movable in ordinary usage) device, while the beacon as stationary, though generally each of the beacon and the receiving device ma be stationary or mobile, and may change their mobility status (mobile-to-stationary and vice versa) at times.

At flow point 501, the receiving device is powered up, initialized, synchronized (for example, to a GPS clock), and ready to perform the steps of the process.

In step 505, the receiving device receives a signal from the beacon. For example, the receiving device receives the signal transmitted by the beacon in the step 415 of the processes 400/450.

In step 510, the receiving device extracts from the received beacon signal the modulation frequencies (e.g., $f_1$, $f_2$, $f_3$, and possibly more). This step may include downconverting the received beacon signal to baseband or intermediate frequency, and extracting/decoding the other information in the beacon's signal (such as coordinates of the beacon and the synchronization scheme/parameters).

In step 515, the receiving device determines at least two phase differences between: among the modulation frequencies, such as $\Delta_{phA}$ and $\Delta_{phB}$, as has been explained above in relation to the three frequency cases and the four-frequency cases. For example, the modulation frequencies can be sampled by a high frequency clock and differences between times of transition can be determined; as another example, pairs of the modulation frequencies can be mixed together and the resulting low-frequency signal examined.

In step 520, the receiving device computes the distance to the beacon (or estimates the distance). The numbered equations (1)-(45) above relating the distance a time from synchronization of phases at the beacon t, the modulation frequencies/wavelengths fs and λs, the phase differences at arrival at the receiving device $\Delta_{phA}/\Delta_{phB}$, and the initial phases φ's can be used for this purpose; see particularly the three-frequency examples and the four-frequency examples. If there is ambiguity (due to the phase rotation), the distance estimate may be combined with "other location information," as this expression is explained below.

In step 525, the receiving device uses the distance estimate calculated in the step 520, possibly in combination with other information, for example, to affect power train operation, braking, and other functions. In examples, a vehicle computer changes deceleration/acceleration rates based on the measure distance/position, changes a decision regarding gear selection or transmission ratio selection, changes a decision regarding; starting/stopping an engine, changes a decision regarding regenerative-versus-conventional braking, or changes/makes another type of decision.

The process 500 may terminate at flow point 599, to be repeated as needed or desired.

As can be seen from the above discussion, when the phases of frequencies ($f_1$, $f_2$, $f_3$, or more) are simultaneously synchronized at the beacon and then measured at the receiver, the receiver can calculate its distance from the beacon based on the measured phase differences and the knowledge of the synchronization scheme. The distance may be calculated with substantial accuracy even in the absence of the receiver having a precise knowledge of the clock reference of the beacon. The clocks at the receiver and the beacon may in fact the synchronized using GPS, and the distance from the beacon can be calculated based on just two frequencies, e.g., $f_1$ and $f_2$, subject to the time uncertainty resulting from the use of the GPS clock. When using phase difference between to frequencies, the distance inaccuracy may be c (the speed of light) multiplied by the GPS time uncertainty. If the time uncertainty is 40 ns, for example, the distance uncertainty is about 12 meters. In the cases of physical proximity of the beacon and the receiver (e g. <10 kilometers), the time uncertainty between their respective clocks may be substantially less than the GPS clock jitter; beacon-receiver distance determination may then rely on two-frequency phase difference, for example, based on the two-equation case, equations (1)-(6) above. Multipath, however, may have substantial effect, particularly on the roads with other vehicles (large reflectors) in the immediate vicinity of the receiver and/or the beacon.

To alleviate MP effects, the beacon may be mounted relatively high above the roadway, for example, at the same height and/or in the same enclosure as the VTCD(s) 135. In embodiments, the beacon's antenna(s) transmitting the DM frequencies is at least ten meters above ground level; in other embodiments, however, the beacon may be flush or even slightly underneath the roadway suffice, preferably with a clear RF path to the surface. But other heights between ground level and the ten-meter elevation are not necessarily excluded, as are not heights above ten meters.

Another way to deal with MP effects is to employ multiple "fingers" at the receiver, each finger configured to receive a single MP component. Such use of receiver "fingers" is known in the design of rake receivers. Here, however, the signals received at each of the fingers are inspected to identify the earliest MP component: the earliest component should correspond to line-of-sight ("LoS") reception of the beacon's transmission (assuming the beacon is LoS to the receiving device). The LOS component can then be processed as has been described, to determine the distance to the beacon.

In embodiments, the receiving device includes a rake receiver for identifying the transmission from the beacon with MP gain. Once the receiving device has identified the beacon transmission, it uses the knowledge of the transmission to extract the earliest MP component. In embodiments, the receiving device uses the earliest MP component from the corresponding finger of the rake receiver.

The receiving device may combine the distance to the TCD 100 information with road map information and other location information to obtain a highly accurate estimate of the global position and position relative to the TCD 100. The "other location information" of the preceding sentence (and as used in other places of this document) may include GPS-provided location information, which may be useful even when not quite accurate because of receiver limitations, MP, and/or other factors; dead-reckoning information; map information; and distance from one or more other beacons, including TCDs with the beacon functionality described above.

There are other techniques for measuring the vehicle-TCD 100 distance, including transponder-based techniques. See, generally, David Munoz et al., Position Location Techniques and Applications (1st Edition, ISBN-13: 978-1402076770), which book has been already mentioned and incorporated by reference.

The TCD 100 may be configured to transmit (e.g., broadcast, multicast, transmit otherwise) through a transmitter 120B information regarding its state and expected changes in the state. The state information may include data specific to different cycles of the state machine of the TCD 100. A vehicle computer may receive the signal from the TCD 100 and determine when the light in its direction of travel will allow the vehicle to proceed. The TCD 100 may also update this information in real time, based on the passage of time and the various GRs that affect its state transitions. The TCD 100 may transmit to the traffic in its vicinity confidence information regarding the states of interest and the timing of the state changes, and may do so in real time. In "real time" means within a time period that the moving traffic can use to its advantage (e.g., to shift discrete or continuous gears, accelerate/decelerate, start/stop engine, engage regenerative braking), typically within two seconds, and, even better within less than one second; in embodiments, the time period is less than 200 milliseconds. Thus, the signal from the TCD 100 may carry information regarding the current state in one or several (e.g., all) of the directions of travel through the intersection controlled by the TCD 100, and the time to the next change in the one or several directions; the vehicle computer can thus use the TCD state information received front the TCD 100 to control the power train for example; in self driving cars and cars traveling with engaged cruise control or another driver-assistance device), including braking, regenerative braking, acceleration/deceleration, starting/stopping of the internal combustion engine (if present in the vehicle), selection of a gear in a multi-gear transmission or selection of a gear ratio in a continuously-variable transmission, selection of a particular electrical storage device for providing motive power or for receiving regenerated electrical power, and engagement/disengagement of a clutch. In connection with the selection of the electrical power source, an inventive vehicle may have a supercapacitor power source in addition to a more conventional electrochemical rechargeable battery (e.g., Li-Ion battery). In controlling the power train, the vehicle computer can use the distance estimate(s) from the TCD or another beacon, in addition to the TCD state information and possibly other information.

The communications between the TCD 100 and a remote facility/resource may be effected through the receivers 120A/transmitters 120B, through separate connections that are not shown in FIG. 1, including, for example, landline connections, cellular connections, WiFi connections to stationary hotspots, VANET network connections, dedicated short-range communications ("DSRC") connections, and combinations of these and/or other types of connections. In embodiments, the communications employ intermediate connections through vehicle computers in the vehicles and/or smartphones and other mobile devices of people (pedestrians/drivers/passengers) passing in the vicinity of the TCD, such as through the intersection controlled by the TCD. The TCD may transmit packets to such devices, with instructions to send the packets to the remote facility resource. The vehicles and/or mobile devices can then use their own connections (e.g., cellular connections to the Internet) to send the packets to the remote facility/resource; if no current connection is available, a vehicle/smartphone or other similar devices with communication/processing capabilities may store the packets and transmit them to the remote facility at a later time, when a connection becomes available. The packets may be encrypted. The TCD may break up its communications into several/many packets, so that individual packets may be sent to the vehicle computers/smartphone during a short time while the vehicle computers/smartphones are in such vicinity of the TCD that reliable communications can be maintained therebetween. The remote facility/resource can transmit its communications back to the TCD in a similar manner, for example, using the vehicles from which it received the TCD packets (because such vehicles are likely to travel in the vicinity of the TCD 100) or other vehicles. The information between the TCD and the remote facility/resource may be transmitted redundantly to increase the probability of valid/uncorrupted receipt at the destination.

The features described throughout this document and all the incorporated documents may be present individually, or in any combination or permutation, except where the presence or absence of specific features (elements/steps/limitations) is inherently required, explicitly indicated, or otherwise made clear from the description. This applies whether or not features appear related to specific embodiments; thus, features of the different described embodiments may be combined.

Although the process steps and decisions (if decision blocks are present) may be described serially in this document, certain steps and/or decisions may be performed by same and/or separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. Furthermore, not every illustrated step and decision block may be required in every embodiment in accordance with the concepts described in this document, while some steps and decision blocks that have not been specifically illustrated may be desirable or necessary for proper operation in some embodiments in accordance with the concepts. It should be noted, however, that specific embodiments/variants/implementations/examples use the particular order(s) in which the steps and decisions (if applicable) are shown and/or described.

The instructions (machine executable code) corresponding to the method steps of the embodiments variants, implementations, and examples disclosed in this document may be embodied directly in hardware, in software, in firmware, or in combinations thereof. A software/firmware module may be stored in volatile, memory, flash memory, Read Only Memory (ROM), Electrically Programmable ROM (EPROM), Electrically Erasable Programmable ROM (EEPROM), hard disk, a CD-ROM, a DVD-ROM, or other forms of non-transitory storage medium known in the art. Exemplary storage medium or media may be coupled to one or more processors so that the one or more processors can read information from, and write information to, the storage medium or media. In an alternative, the storage medium or media may be integral with one or more processors.

This document describes in detail the inventive apparatus, methods, and articles of manufacture for operating TCD/beacons, vehicle computers, smart phones, and related technologies. This was done for illustration purposes and, therefore, the foregoing description is not necessarily intended to limit the spirit and scope of the invention(s) described. Neither the specific embodiments of the invention(s) as a whole, nor those of its (or their, as the case may be) features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features may be employed in the absence of use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

I claim:

1. A method of diagnosing traffic control systems, the method comprising:
   recording one or more images of a visual traffic control display (VTCD) of a traffic control device (TCD) of a computer-based traffic control system during a diagnostic period;
   obtaining an expected state of the VTCD during the diagnostic period;
   processing the one or more images to identify an actual state of the VTCD, the actual state of the VTCD being contemporaneous with the expected state of the VTCD, by the computer-based traffic control system;
   comparing the actual state of the VTCD with the expected state of the VTCD to determine whether a mismatch exists between the actual state of the VTCD and the expected state of the VTCD, the mismatch indicating a malfunction of the TCD or of a sensor connected to the TCD; and
   performing at least one of a corrective action and a remedial action in response to the malfunction;
   wherein the step of recording the one or more images is performed by a camera external to the TCD.

2. The method of claim 1, wherein the corrective action comprises sending a notification regarding the malfunction to a remote facility, and the remedial action comprises adjusting a state machine of the TCD to mitigate the malfunction.

3. A method of diagnosing traffic control systems, the method comprising:
   obtaining one or more images of a visual traffic control display (VTCD) of a traffic control device (TCD) of a computer-based traffic control system during a diagnostic period, wherein the step of obtaining the one or more images is performed through a camera external to the TCD, the camera external to the TCD being part of a camera-equipped device external to the TCD;
   obtaining one or more expected states of the VTCD during the diagnostic period;
   processing the one or more images to identify one or more actual states of the VTCD during the diagnostic period, by the computer-based traffic control system;
   comparing the one or more actual states with the one or more expected states to determine whether a mismatch exists between at least one actual state of the one or more actual states and an expected state of the one or more expected states that is contemporaneous with the at least one actual state, the mismatch indicating a malfunction of the TCD or of a sensor connected to the TCD;
   operating a state machine of the TCD to control traffic through one or more visual traffic control displays of the TCD, the one or more visual traffic control displays comprising the VTCD; and
   in response to the mismatch, performing at least one action responsive to the mismatch, the at least one action responsive to the mismatch being a remedial action or a corrective action.

4. The method of claim 3, further comprising:
   monitoring power consumed by the VTCD to determine whether power consumed by the VTCD is below a first predetermined power threshold;
   varying the first predetermined power threshold depending on expected power consumption of the VTCD during current state of the state machine;
   wherein at least one of the steps of obtaining the one or more images, obtaining the one or more expected states, processing the one or more images, and comparing is performed in response to the power consumed by the VTCD falling below the first predetermined power threshold.

5. The method of claim 3, further comprising:
   monitoring power consumed by the VTCD to determine whether power consumed by the VTCD is above a second predetermined power threshold;
   varying the second predetermined power threshold depending on expected power consumption of the VTCD during current state of the state machine;
   wherein at least one of the steps of obtaining the one or more images, obtaining the one or more expected states, processing the one or more images, and comparing is performed in response to the power consumed by the VTCD exceeding the second predetermined power threshold.

6. The method of claim 3, further comprising:
   monitoring traffic flow through an intersection controlled by the TCD to detect a predetermined irregularity in the traffic flow;
   wherein:
   at least one of the steps of obtaining the one or more images, obtaining the one or more expected states, processing the one or more images, and comparing is performed in response to detection of the predetermined irregularity; and
   the predetermined irregularity varies based at least on one of calendar, time, and local event attributes.

7. The method of claim 3, further comprising:
receiving at the TCD a diagnosing trigger signal (DTS);
wherein the step of obtaining the one or more expected states is performed in response to receipt of the DTS by the TCD.

8. The method of claim 7, wherein at least one of the steps of processing the one or more images and comparing is performed by a remote facility comprising a computer system remote from the TCD.

9. The method of claim 3, wherein the step of comparing is performed by the TCD.

10. The method of claim 3, the camera-equipped device external to the TCD is a nearby device relative to the TCD.

11. The method of claim 3, further comprising:
sending a request for the one or more images from the TCD to the camera-equipped device external to the TCD.

12. The method of claim 3, further comprising:
sending a request for the one or more images from a remote facility to the camera-equipped device external to the TCD, the remote facility comprising at least one computer system remote to the TCD.

13. The method of claim 3, wherein:
the camera-equipped device external to the TCD is a mobile device of a person in vicinity of the TCD.

14. The method of claim 3, wherein:
the camera external to the TCD is installed in a vehicle in vicinity of the TCD.

15. The method of claim 3, wherein the one or more images are captured and transmitted to at least one of the TCD and a computer system remote to the TCD, in real time.

16. The method of claim 3, wherein the at least one action responsive to the mismatch comprises sending by the TCD to a remote facility a notification regarding the malfunction indicated by the mismatch.

17. The method of claim 3, wherein the at least one action responsive to the mismatch comprises adjusting the state machine to mitigate the malfunction indicated by the mismatch.

18. A traffic control device (TCD), comprising:
a processing module, storage, a visual traffic control display (VTCD), one or more interfaces to one or more remote computer systems and to a camera-equipped device external to the TCD, and one or more connections coupling the processing module to the storage, the VTCD, and the one or more interfaces, wherein the processing module is configured to:
acquire one or more images of the VTCD during a diagnostic period, from the camera-equipped device external to the TCD;
obtain one or more expected states of the VTCD during the diagnostic period;
process the one or more images to identify one or more actual VTCD states of the VTCD during the diagnostic period;
compare the one or more actual VTCD states of the VTCD with the one or more expected states of the VTCD to determine whether a mismatch exists between contemporaneous actual and expected states of the VTCD; and
perform at least one action responsive to the mismatch, wherein the at least one action responsive to the mismatch includes transmission of a maintenance request to the one or more remote computer systems or adjustment of a state machine of the TCD to mitigate a malfunction indicated by the mismatch.

19. A traffic control system comprising:
the TCD of claim 18; and
the one or more remote computer systems;
wherein the processing module is further configured so that the at least one action responsive to the mismatch comprises the transmission of the maintenance request to the one or more remote computer systems.

20. A traffic control system comprising:
the TCD of claim 18; and
the one or more remote computer systems;
wherein:
the processing module is further configured to operate the state machine of the TCD to control traffic through one or more visual traffic control displays of the TCD, the one or more visual traffic control displays comprising the VTCD; and
the processing module is further configured so that the at least one action responsive to the mismatch comprises the adjustment of the state machine to mitigate the malfunction indicated by the mismatch.

* * * * *

UNITED STATES PATENT AND TRADEMARK OFFICE
CERTIFICATE OF CORRECTION

PATENT NO. : 11,866,046 B2
APPLICATION NO. : 17/061576
DATED : January 9, 2024
INVENTOR(S) : Anatoly S. Weiser Page 1 of 8

It is certified that error appears in the above-identified patent and that said Letters Patent is hereby corrected as shown below:

In the Specification

Column 3, Line 48, cancel "displays)," and replace with --display(s),--;

Column 4, Line 31, cancel "display)," and replace with --display(s),--;

Column 4, Line 50, cancel "states)" and replace with --state(s)--;

Column 5, Line 16, cancel "storage" and replace with --storage,--;

Column 6, Line 8, cancel "and," and replace with --and--;

Column 6, Line 11, cancel "(such" and replace with --(such as--;

Column 6, Line 21, cancel "any" and replace with --by--;

Column 6, Line 23, cancel "engaging," and replace with --engaging--;

Column 6, Line 46, cancel "processing," and replace with --processing--;

Column 6, Line 54, cancel "Me" and replace with --the--;

Column 6, Line 62, cancel "and," and replace with --and--;

Column 7, Line 16, cancel "of the TCD and" and replace with --of the TCD) and--;

Column 7, Line 26, cancel "between among" and replace with --between/among--;

Column 8, Line 8, cancel "identifying," and replace with --identifying--;

Signed and Sealed this
Twenty-seventh Day of February, 2024

Katherine Kelly Vidal
*Director of the United States Patent and Trademark Office*

CERTIFICATE OF CORRECTION (continued)
U.S. Pat. No. 11,866,046 B2

Column 8, Line 20, cancel "iii" and replace with --in--;

Column 8, Line 50, cancel "transmit the fear" and replace with --transmitting the clear--;

Column 9, Line 16, cancel "raffle" and replace with --of traffic--;

Column 9, Line 28, cancel "TCD:" and replace with --TCD;--;

Column 9, Line 40, cancel "ing," and replace with --ing--;

Column 9, Line 60, cancel "processing," and replace with --processing--;

Column 10, Line 48, cancel "flow, and" and replace with --flow; and--;

Column 11, Line 5, cancel "camera device" and replace with --camera-equipped device--;

Column 11, Line 13, cancel "mobile d a person" and replace with --mobile device of a person--;

Column 11, Line 17, cancel "TCD an a" and replace with --TCD and a--;

Column 11, Line 25, cancel "mitigating, action" and replace with --mitigating action--;

Column 11, Line 26, cancel "indicate by" and replace with --indicated by--;

Column 11, Line 28, cancel "devices" and replace with --device--;

Column 11, Line 32, cancel "TCD and" and replace with --TCD, and--;

Column 11, Line 37, cancel "TCD obtain" and replace with --TCD; obtain--;

Column 11, Line 55, cancel "described in his document" and replace with --described in this document--;

Column 11, Line 62, cancel "blocks" and replace with --block--;

Column 12, Line 2, cancel "transmitting" and replace with --estimating--;

Column 12, Line 31, cancel "examples. Or" and replace with --examples, or--;

Column 12, Line 49, cancel "couple disconnected" and replace with --coupled/connected--;

Column 12, Line 56, cancel "Now that" and replace with --Note that--;

Column 13, Line 6, cancel "feet 04.8 meters" and replace with --feet/304.8 meters--;

Column 13, Line 13, cancel "TCD)." and replace with --TCD.--;

Column 13, Line 28, cancel "be for example, an RSV" and replace with --be, for example, an RSU--;

Column 13, Line 33, cancel "passing," and replace with --passing--;

Column 14, Line 59, cancel ""false GR" "FGR."" and replace with --"false GR" or "FGR."--;

Column 15, Line 10, cancel "fake" and replace with --false--;

Column 15, Line 19, cancel "had" and replace with --bad--;

Column 15, Line 21, cancel "hardware of software" and replace with --hardware/software--;

Column 15, Line 22, cancel "hard," and replace with --hard.--;

Column 15, Line 23, cancel "be af unknown" and replace with --be of unknown--;

Column 15, Line 25, cancel "tune" and replace with --time--;

Column 15, Line 42, cancel "or "TCD") " and replace with --TGR--;

Column 15, Line 47, cancel "UTGR," and replace with --UTGR.--;

Column 15, Line 53, cancel "Road way" and replace with --Roadway--;

Column 16, Line 20, cancel "computers)" and replace with --computer(s)--;

Column 16, Line 22, cancel "is/arc" and replace with --is/are--;

Column 16, Line 24, cancel "to and/or" and replace with --to, and/or--;

Column 16, Line 62, cancel "eras)" and replace with --era(s)--;

Column 16, Line 64, cancel "state affecting" and replace with --state-affecting--;

Column 17, Line 9, cancel "processing," and replace with --processing--;

Column 17, Line 29, cancel "storage media storage media" and replace with --storage media. Non-volatile storage media--;

Column 17, Line 30, cancel "hack-up." and replace with --back-up.--;

Column 17, Line 39, cancel "RE receivers" and replace with --RF receivers--;

Column 18, Line 35, cancel "VTCD" and replace with --TCD--;

CERTIFICATE OF CORRECTION (continued)
U.S. Pat. No. 11,866,046 B2

Column 18, Line 41, cancel "traffic, detectors," and replace with --traffic detectors,--;

Column 18, Line 48, cancel "byway" and replace with --by way--;

Column 19, Line 18, cancel "far" and replace with --or--;

Column 19, Line 23, cancel "eras)" and replace with --era(s)--;

Column 19, Line 29, cancel "multi directional" and replace with --multi-directional--;

Column 19, Line 51, cancel "vehicles:" and replace with --vehicles;--;

Column 20, Line 60, cancel "Neural," and replace with --Neural--;

Column 21, Line 47, cancel "of e.g.," and replace with --of, e.g.,--;

Column 22, Line 14, cancel "(and more" and replace with --(and, more--;

Column 22, Line 22, cancel "50 millisecond" and replace with --50 milliseconds--;

Column 22, Line 27, cancel "loop sensor)" and replace with --loop sensor GR)--;

Column 22, Line 29, cancel "aim's" and replace with --arm's--;

Column 22, Line 50, cancel "for a" and replace with --(or a--;

Column 22, Line 65, cancel "FCR)" and replace with --FGR)--;

Column 23, Line 34, cancel "as COSS is loop" and replace with --a COSS is loop--;

Column 23, Line 35, cancel "JR." and replace with --GR.--;

Column 23, Line 45, cancel "FUR" and replace with --FGR--;

Column 23, Line 66, cancel "visual/IRAN" and replace with --visual/IR/UV--;

Column 24, Line 11, cancel "not, illustrated" and replace with --not illustrated in--;

Column 24, Line 33, cancel "Appl," and replace with --Appl.--;

Column 24, Line 37, cancel "IR/DV video, visible/IR/IN" and replace with --IR/UV video, visible/IR/UV--;

Column 24, Line 63, cancel "devices)" and replace with --device(s)--;

Column 25, Line 34, cancel "TO)" and replace with --TCD--;

CERTIFICATE OF CORRECTION (continued)
U.S. Pat. No. 11,866,046 B2

Column 25, Line 36, cancel "TOE)" and replace with --TCD--;

Column 25, Line 41, cancel "perforated" and replace with --performed--;

Column 25, Line 43, cancel "max" and replace with --may--;

Column 26, Line 27, cancel "100 to" and replace with --100, to--;

Column 26, Line 28, cancel "Machine" and replace with --machine--;

Column 27, Line 2, cancel "need" and replace with --needed--;

Column 27, Line 13, cancel "still/video/lidar/RF/sound/other" and replace with --still/video/lidar/radar/RF/sound/other--;

Column 27, Line 22, cancel ""COSS REAL GR" decisions" and replace with --"COSS REAL GR?" decisions--;

Column 27, Line 43, cancel "camera" and replace with --camera,--;

Column 27, Line 44, cancel "TCD nearby" and replace with --TCD nearby,--;

Column 27, Line 55, cancel "recordings)" and replace with --recording(s)--;

Column 27, Line 61, cancel "entations)," and replace with --entations);--;

Column 28, Line 19, cancel "CIR" and replace with --GR--;

Column 28, Line 22, cancel "appearance" and replace with --appearance/--;

Column 28, Line 23, cancel "attire" and replace with --signature--;

Column 28, Line 23, cancel "vehicle object," and replace with --vehicle/object,--;

Column 28, Line 23, cancel "appearance" and replace with --appearance/--;

Column 28, Line 41, cancel "way" and replace with --may--;

Column 28, Line 60, cancel "tor above" and replace with --(or above--;

Column 29, Line 11, cancel "now" and replace with --flow--;

Column 29, Line 63, cancel "elements," and replace with --elements;--;

Column 30, Line 23, cancel "VICE)" and replace with --VTCD--;

Column 30, Line 24, cancel "pattern/regularity" and replace with --pattern/irregularity--;

Column 30, Line 40, cancel "point a the" and replace with --point of the--;

Column 30, Line 43, cancel "WES" and replace with --DTS--;

Column 30, Line 44, cancel "DES" and replace with --DTS--;

Column 30, Line 59, cancel "passing," and replace with --passing--;

Column 31, Line 22, cancel "CD," and replace with --VTCD,--;

Column 31, Line 33, cancel "a and" and replace with --and--;

Column 31, Line 36, cancel "properly, if" and replace with --properly. If--;

Column 31, Line 41, cancel "VTCD from" and replace with --VTCD (from--;

Column 31, Line 41, cancel "TCD)," and replace with --TCD)--;

Column 31, Line 48, cancel "outcome mile of" and replace with --outcome of--;

Column 31, Line 55, cancel "problem(s)" and replace with --the problem(s)--;

Column 31, Line 65, cancel "TCDs" and replace with --VTCDs--;

Column 32, Line 24, cancel "rotatively" and replace with --relatively--;

Column 32, Line 58, cancel "thereof" and replace with --thereof,--;

Column 33, Line 4, cancel "Facility" and replace with --facility--;

Column 33, Line 28, cancel "slates" and replace with --states--;

Column 33, Line 39, cancel "recorded:" and replace with --recorded;--;

Column 34, Line 25, cancel "light:" and replace with --light;--;

Column 34, Line 58, cancel "114)" and replace with --110--;

Column 35, Line 5, cancel "requests another example," and replace with --request. As another example,--;

Column 35, Line 13, cancel "malfunctions)," and replace with --malfunction(s),--;

Column 35, Line 31, cancel "VIM" and replace with --VTCD--;

Column 35, Line 54, cancel "devices)" and replace with --device(s)--;

Column 36, Line 2, cancel "slates" and replace with --states--;

Column 36, Lines 7-8, cancel "smart watches" and replace with --smartwatches--;

Column 36, Line 21, cancel "interfaced) 140." and replace with --interface(s) 140.--;

Column 36, Line 47, cancel "UPS" and replace with --GPS--;

Column 36, Line 48, cancel "OPS" and replace with --GPS--;

Column 36, Line 49, cancel "UPS" and replace with --GPS--;

Column 38, Line 18, cancel "equation (1)," and replace with --equation (1)),--;

Column 39, Line 55, cancel "a the" and replace with --of the--;

Column 39, Line 60, cancel "2.5 kilometers;" and replace with --25 kilometers;--;

Column 40, Line 3, cancel "<," and replace with --,--;

Column 40, Line 12, cancel "ease:" and replace with --case:--;

Column 40, Line 67, cancel "selected in frequencies" and replace with --selected frequencies--;

Column 42, Line 4, cancel "receiving," and replace with --receiving--;

Column 42, Line 20, cancel "$\Delta_{\lambda A} = (\lambda_2-\lambda_2);$" and replace with --$\Delta_{\lambda A} = (\lambda_2-\lambda_1);$--;

Column 42, Line 43, cancel "$\frac{(T*(2*\pi*\Delta_{fA})-(\Delta_{phA}-\Delta_{\phi A}))*\lambda_1*\lambda_2}{2*\pi*\Delta_{\lambda A}};$" and replace with --$\frac{(t*(2*\pi*\Delta_{fA})-(\Delta_{phA}-\Delta_{\phi A}))*\lambda_1*\lambda_2}{2*\pi*\Delta_{\lambda A}};$--;

Column 43, Line 13, cancel "$\lambda_1 < \lambda_3;$ and" and replace with --$\lambda_4 < \lambda_3;$ and--;

Column 43, Line 14, cancel "define $P1-P2, \Delta_{fA} = (f_1 f_2),$" and replace with --define $\Delta_{phA} = P1-P2, \Delta_{fA} = (f_1-f_2),$--;

Column 43, Line 45, cancel "($f_3$, and $f_4$)," and replace with --($f_1, f_2, f_3$, and $f_4$),--;

Column 43, Line 46, cancel "$\lambda_1 \lambda_2, \lambda_3$, and $\lambda_4$)," and replace with --($\lambda_1, \lambda_2, \lambda_3$, and $\lambda_4$),--;

CERTIFICATE OF CORRECTION (continued)
U.S. Pat. No. 11,866,046 B2

Column 43, Line 48, cancel "and $\Delta_{phB}$:" and replace with --and $\Delta_{phB}$;--;

Column 43, Line 51, cancel "distance, D, Can" and replace with --distance, D, can--;

Column 44, Line 2, cancel "TCD beacon" and replace with --TCD/beacon--;

Column 44, Line 19, cancel "tag," and replace with --(e.g.,--;

Column 44, Line 35, cancel "value." and replace with --value,--;

Column 44, Line 63, cancel "frequencies used" and replace with --frequencies fn used--;

Column 45, Line 38, cancel "beacon as stationary" and replace with --beacon is stationary--;

Column 45, Line 39, cancel "ma be" and replace with --may be--;

Column 45, Line 57, cancel "between: among" and replace with --between/among--;

Column 45, Line 67, cancel "distance a time" and replace with --distance D, time--;

Column 46, Line 16, cancel "regarding;" and replace with --regarding--;

Column 46, Line 62, cancel "component:" and replace with --component;--;

Column 47, Line 50, cancel "front" and replace with --from--;

Column 47, Line 50, cancel "train for" and replace with --train (for--;

Column 47, Line 51, cancel "example;" and replace with --example,--;

Column 48, Line 15, cancel "facility resource." and replace with --facility/resource.--;

Column 49, Line 15, cancel "TCD/" and replace with --TCDs/--;

In the Claims

Column 51, Line 12, Claim 10, cancel "3, the" and replace with --3, wherein the--.